(12) United States Patent
Kim et al.

(10) Patent No.: US 11,957,266 B2
(45) Date of Patent: Apr. 16, 2024

(54) ELECTRIC HEATING POT

(71) Applicant: No Eul Kim, Busan (KR)

(72) Inventors: No Eul Kim, Busan (KR); Young Tae Kim, Busan (KR)

(73) Assignee: No Eul Kim, Busan (KR)

( * ) Notice: Subject to any disclaimer, the term of this patent is extended or adjusted under 35 U.S.C. 154(b) by 274 days.

(21) Appl. No.: 17/284,193

(22) PCT Filed: Oct. 10, 2019

(86) PCT No.: PCT/KR2019/013296
§ 371 (c)(1),
(2) Date: Apr. 9, 2021

(87) PCT Pub. No.: WO2020/076096
PCT Pub. Date: Apr. 16, 2020

(65) Prior Publication Data
US 2021/0337998 A1    Nov. 4, 2021

(30) Foreign Application Priority Data

Oct. 10, 2018    (KR) .................. 10-2018-0120608

(51) Int. Cl.
*A47J 27/21*    (2006.01)
*H05B 3/00*    (2006.01)
*H05B 3/68*    (2006.01)
*H05B 3/80*    (2006.01)

(52) U.S. Cl.
CPC ..... *A47J 27/2105* (2013.01); *A47J 27/21166* (2013.01); *H05B 3/0004* (2013.01); *H05B 3/681* (2013.01); *H05B 3/80* (2013.01); *H05B 2203/021* (2013.01)

(58) Field of Classification Search
CPC .......... H05B 3/0004; H05B 3/60; H05B 3/68; H05B 3/681; H05B 3/80; H05B 3/82; H05B 2203/021; H05B 2203/022; A47J 27/21; A47J 27/21008; A47J 27/21025; A47J 27/21041; A47J 27/2105; A47J 27/21066; A47J 27/21083; A47J 27/21091;
(Continued)

(56) References Cited

U.S. PATENT DOCUMENTS

2008/0264926 A1    10/2008    Peng

FOREIGN PATENT DOCUMENTS

| CA | 2613910 A1 | * | 6/2009 | ............. F24H 1/106 |
| CN | 201445345 U | * | 5/2010 | |
| EP | 0872201 B1 | * | 11/2002 | .......... A47J 27/2105 |

(Continued)

OTHER PUBLICATIONS

International Search Report dated Jan. 16, 2020 in corresponding International application No. PCT/KR2019/013296; 4 pages.

*Primary Examiner* — Hung D Nguyen
(74) *Attorney, Agent, or Firm* — Maier & Maier, PLLC

(57) ABSTRACT

An electric heating pot including a body unit and a heating unit configured to provide heat to the body unit. The body unit includes an accommodation space configured to accommodate liquid, the heating unit includes a housing formed such that electrolyzed water is disposed therein, and an electrode portion that is disposed in the housing, formed such that at least one region thereof is in contact with the electrolyzed water in the housing, and includes a plurality of electrodes.

7 Claims, 22 Drawing Sheets

(58) Field of Classification Search
CPC ............ A47J 27/21166; A47J 27/21175; A47J 27/21183; A47J 27/21191
See application file for complete search history.

(56) References Cited

FOREIGN PATENT DOCUMENTS

| | | | |
|---|---|---|---|
| FR | 2925276 A1 * | 6/2009 | ............ A47J 27/004 |
| KR | 10-2006-0067857 A | 6/2006 | |
| KR | 10-1112122 B1 | 2/2012 | |
| KR | 10-2012-0119515 A | 10/2012 | |
| KR | 10-1652671 B1 | 9/2016 | |

* cited by examiner

ELECTRIC HEATING POT

FIELD

The present disclosure relates to an electric heating pot.

BACKGROUND

Various electric heating pots for heating liquid, for example, water, are being sold in accordance with the needs of users, and various research and development to improve the same are being conducted.

In particular, as the standard of living improves, heated liquid, such as hot water, is being used for various purposes.

Further, with industrialization and the advancement of technology, a pattern of individual life changes, and the use of time becomes important. Accordingly, a method of heating liquid by simply using an electric heating pot has been widely used.

However, there is a limitation in implementing a technology that improves the efficiency of an electric heating pot while improving user convenience and safety.

SUMMARY

The present disclosure is directed to providing an electric heating pot capable of improving efficiency while improving electrical stability and user convenience.

One aspect of the present disclosure provides an electric heating pot including a body unit and a heating unit configured to provide heat to the body unit, wherein, the body unit includes an accommodation space configured to accommodate liquid, the heating unit includes a housing formed such that electrolyzed water is disposed therein, and an electrode portion that is disposed in the housing, formed such that at least one region thereof is in contact with the electrolyzed water in the housing, and includes a plurality of electrodes.

In an embodiment, the body unit and the heating unit may be formed to be separable from each other.

In an embodiment, at least one region of the housing may include an insulating material.

In an embodiment, an extending end portion of each of the plurality of electrodes may be formed to be spaced apart from the inner surface of the housing.

In an embodiment, the housing may include an upper surface portion facing the body unit and a bottom portion facing a side opposite to the body unit, and the plurality of electrodes of the electrode portion may be formed to be spaced apart from the upper surface portion and the bottom portion.

In an embodiment, the electrode portion may include a curved region.

In an embodiment, the electric heating pot may further include an insulating layer disposed between the heating unit and the body unit.

In an embodiment, the electric heating pot may further include a heat transfer portion disposed between the heating unit and the body unit.

Other aspects, features, and advantages other than the above-described features will be apparent from the following drawings, claims, and detailed descriptions of the disclosure.

An electric heating pot according to the present disclosure can improve efficiency while improving electrical stability and user convenience.

DETAILED DESCRIPTION

Figure 1:
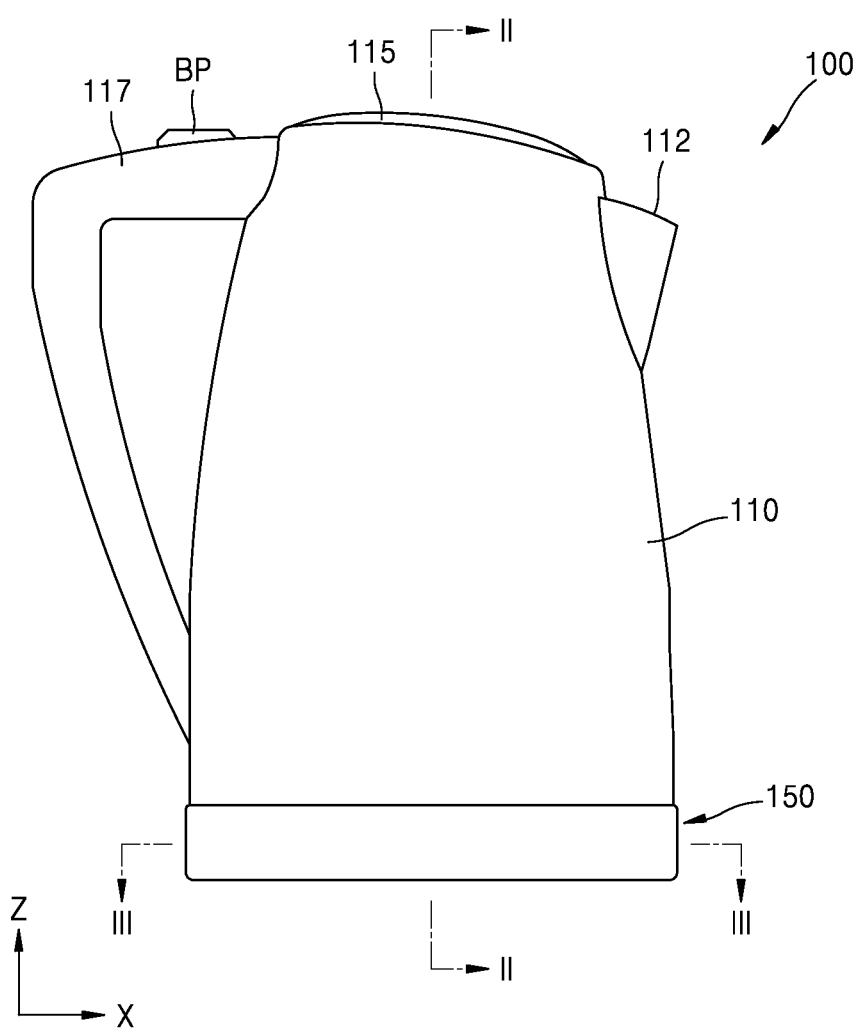
FIG. 1 is a schematic front view illustrating an electric heating pot according to an embodiment of the present disclosure.

Hereinafter, the configuration and operation of the present disclosure will be described in detail with reference to embodiments of the present disclosure shown in the accompanying drawings.

While the present disclosure is susceptible to various modifications and alternative forms, specific embodiments thereof are shown by way of example in the drawings and will herein be described in detail. Advantages and features of the present disclosure and methods for accomplishing the same will be more clearly understood from the embodiments described below with reference to the drawings. However, the present disclosure is not limited to the embodiments disclosed below but may be implemented in various forms.

Hereinafter, the embodiments of the present disclosure will be described below in detail with reference to the accompanying drawings, but when describing with reference to the drawings, equal or corresponding components will be referred to as the same reference numerals, and redundant descriptions thereof will be omitted.

In the following embodiments, the terms "first," "second," and the like have been used to distinguish one component from another, rather than limitative in all aspects.

In the following embodiments, singular forms are intended to include plural forms as well, unless the context clearly indicates otherwise.

In the following embodiments, the terms such as "including," "having," and "comprising" are intended to indicate the existence of features or components disclosed in the specification, and are not intended to preclude the possibility that one or more other features or components may be added.

For convenience of description, sizes of components shown in the drawings may be exaggerated or reduced. For example, since the size and thickness of each component illustrated in the drawing are arbitrarily shown for convenience of description, the present disclosure is not necessarily limited to those illustrated in the drawing.

In the following embodiments, an x-axis, a y-axis, and a z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process sequence may be performed differently from the described order. For example, two consecutively described processes may be performed substantially at the same time or performed in an order opposite to the described order.

Figure 2:
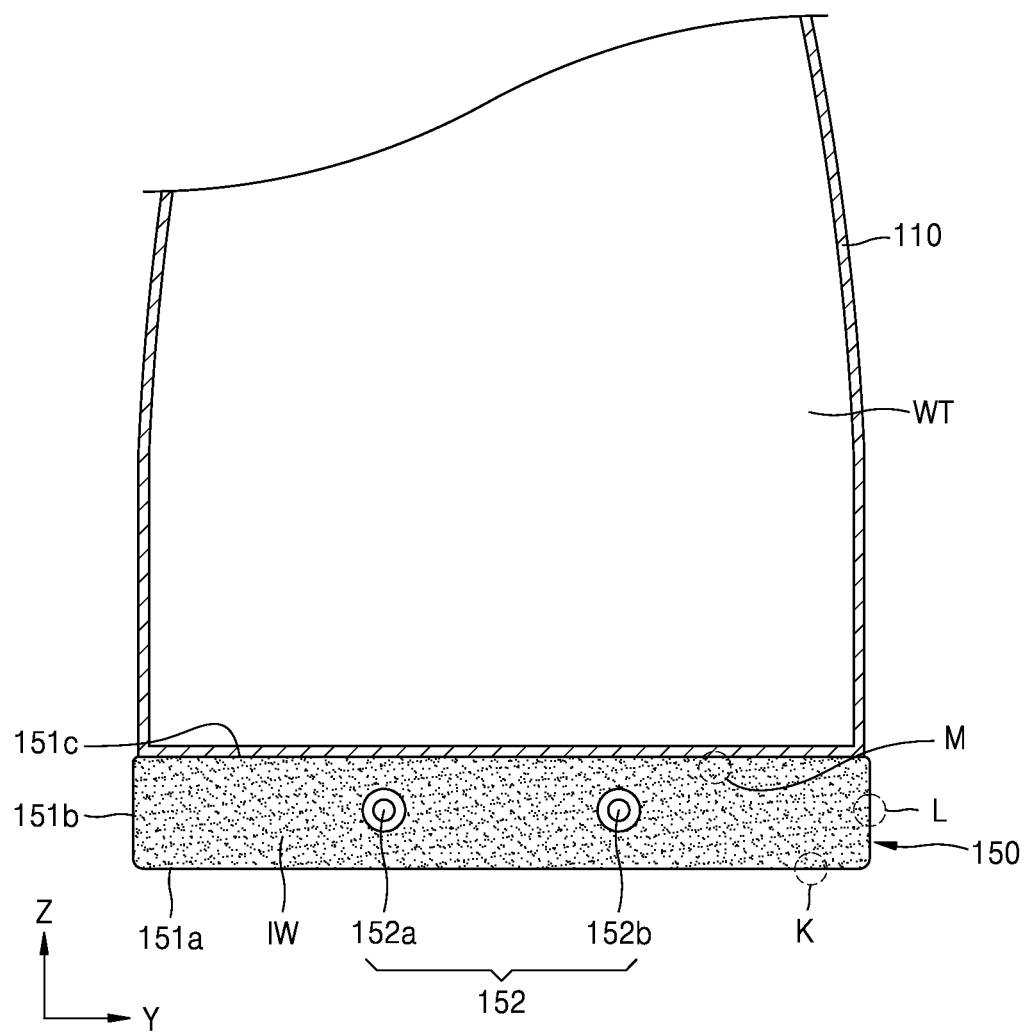
FIG. 2 is a cross-sectional view taken along line II-II of FIG. 1.
Figure 3:
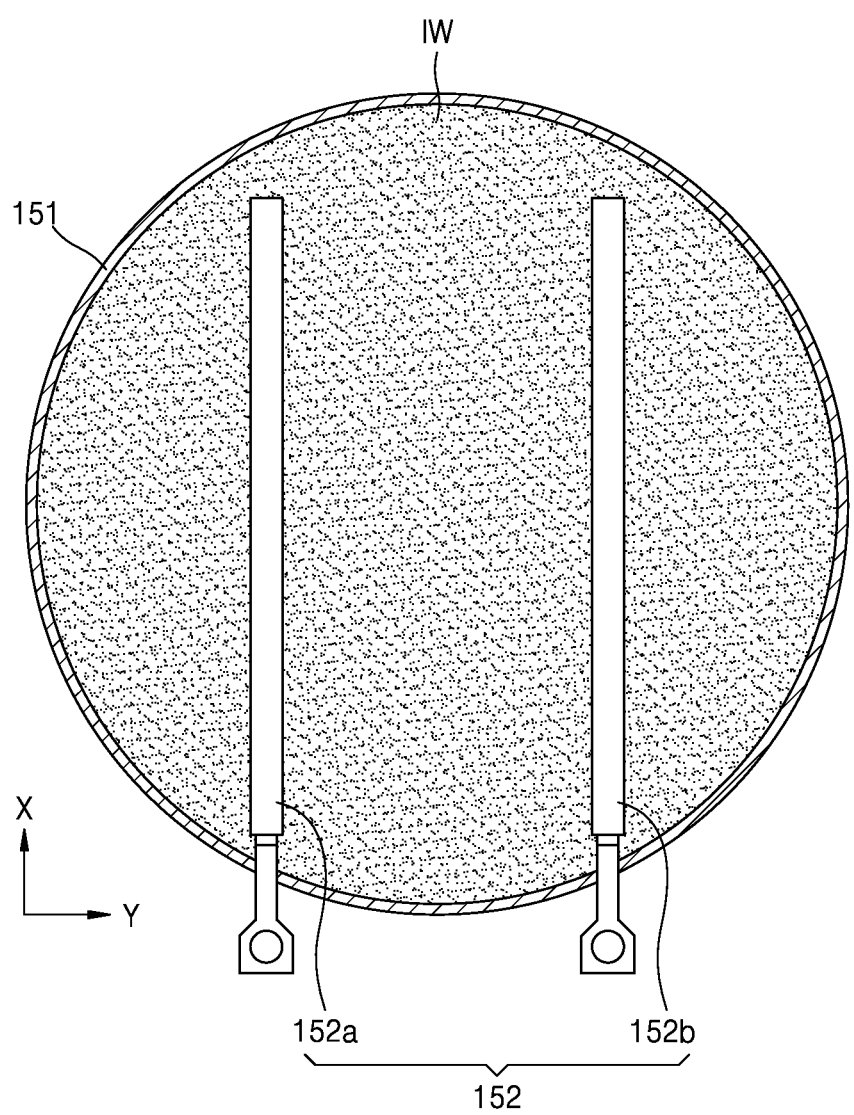
FIG. 3 is a cross-sectional view taken along line of FIG. 1.

FIG. 1 is a schematic front view illustrating an electric heating pot according to an embodiment of the present disclosure, FIG. 2 is a cross-sectional view taken along line II-II of FIG. 1, FIG. 3 is a cross-sectional view taken along line of FIG. 1, and FIGS. 4A, 4B, and 4C are enlarged views respectively illustrating modified examples of portions K, L, and M of FIG. 2.

Referring to FIGS. 1 to 3, an electric heating pot 100 of the present embodiment may include a body unit 110 and a heating unit 150.

The body unit 110 may be disposed to be adjacent to the heating unit 150 in one direction. For example, the body unit 110 may be disposed to be adjacent to the heating unit 150 in a length direction of the body unit 110.

In an embodiment, the body unit 110 and the heating unit 150 may be formed to be connected to each other. For example, the body unit 110 and the heating unit 150 may be integrally formed. In addition, the body unit 110 and the heating unit 150 may be in contact with each other or may be integrally formed with an intermediate member further disposed therebetween.

In an embodiment, the body unit 110 and the heating unit 150 may be formed to be separable from each other.

The body unit 110 may include an accommodation space configured to accommodate a liquid WT. The liquid WT may include various types of liquids, and may include various types of liquids that may be heated by the heating unit 150. For example, the liquid WT may include water, and in this case, the electric heating pot 100 may be used by a user to heat water.

In an embodiment, a discharge outlet 112, through which the liquid WT is discharged from the accommodation space of the body unit 110 by an operation such as pouring the liquid WT, may be formed to be connected to the accommodation space of the body unit 110.

In an embodiment, a handle 117 may be formed on one region of the body unit 110 so that the electric heating pot 100 may be easily handled. In addition, one or more button members BP may be formed on the handle 117 so that the user selectively controls the operation of the electric heating pot 100. The button member BP may be a button having a form physically separated from the handle 117, or in an embodiment, the button member BP may include a button shape displayed on a display portion (not shown).

The heating unit 150 may be configured to provide heat to the body unit 110. For example, the heating unit 150 may be configured to heat the liquid WT accommodated in the accommodation space of the body unit 110.

The heating unit 150 may include a housing 151 and an electrode portion 152.

The housing 151 may be formed to accommodate an electrolyzed water IW. The electrolyzed water IW may include various types of electrolyzed water. For example, the electrolyzed water IW may include an electrolyte solution. In an embodiment, the electrolyzed water IW may include distilled water, filtered water, mineral water, tap water, and the like in which at least one of various types of electrolyte solutions is appropriately diluted.

As an electrolyte material included in the electrolyzed water IW, there are various types including rust inhibitors or the like that contain edible soda, chlorite, silicate, an inorganic material of polyphosphate, amines, oxyacids, or the like as main components.

The housing 151 may have various shapes and may be configured to control at least the entry and exit of the electrolyzed water IW. For example, the housing 151 may be formed such that, after the electrolyzed water IW is filled in the housing 151, the electrolyzed water IW does not flow out to the outside of the housing 151.

In an embodiment, the housing 151 may include a replenishment inlet (not shown) through which the electrolyzed water IW may be replenished when necessary. In addition, separately from the replenishment inlet or using the replenishment inlet, the electrolyzed water IW may be replaced with new one after discharging the electrolyzed water IW from the housing 151. Also, in a state in which there is no electrolyzed water IW in a space inside the housing 151, the housing 151 may be stored or repairs and the like may be performed.

The housing 151 may include various materials. For example, the housing 151 may include a durable material and may include a metal material as an example.

In an embodiment, the housing 151 may include an insulating material. For example, the housing 151 may include a resin or a ceramic.

In an embodiment, the housing 151 may include a Teflon resin that is a fluorine resin.

In an embodiment, among surfaces of the housing 151, at least an inner surface adjacent to the electrolyzed water IW may include an insulating layer, and for example, may include a Teflon resin layer. The Teflon resin layer may be an insulating Teflon layer.

Further, in an embodiment, among the surfaces of the housing 151, the inner surface adjacent to the electrolyzed water IW may include an antistatic Teflon resin layer.

In an embodiment, the housing 151 may have a shape similar to an outer shape of the body unit 110, and for example, may have an edge with a shape similar to a circle.

In an embodiment, the housing 151 may have a pillar shape with a small height, and may include a bottom portion 151a, a side surface portion 151b, and an upper surface portion 151c.

The electrode portion 152 may be disposed in the housing 151, may be formed such that at least one region thereof is in contact with the electrolyzed water IW in the housing, and may include a plurality of electrodes.

For example, the electrode portion 152 may include a first electrode 152a and a second electrode 152b.

Each of the first electrode 152a and the second electrode 152b may be formed to be in contact with the electrolyzed water IW in the housing 151. Although not shown in the drawings, current may be applied to the first electrode 152a and the second electrode 152b under the control of an electrode control portion (not shown), and the applied current may be controlled through the electrode control portion (not shown).

The electrolyzed water IW in the housing 151 may be heated due the current applied to the first electrode 152a and the second electrode 152b of the electrode portion 152. Heat of the electrolyzed water IW may be transferred to the body unit 110 to heat the liquid WT in the accommodation space.

The first electrode 152a and the second electrode 152b may be formed to be spaced apart from each other by a predetermined interval.

For example, the first electrode 152a and the second electrode 152b may have a shape that is elongated while being spaced apart from each other by a predetermined interval, and may each have a linear shape. An end portion extending from each of the first electrode 152a and the second electrode 152b may be formed to be spaced apart from a region of the housing 151, for example, the side surface portion 151b.

Further, in an embodiment, the first electrode 152a and the second electrode 152b may be formed to be spaced apart from the bottom portion 151a and the upper surface portion 151c of the housing 151.

Further, a conductive portion (not shown) connected to one region of each of the first electrode 152a and the second electrode 152b may be included so that current is applied to the first electrode 152a and the second electrode 152b therethrough. The conductive portion (not shown) may be a wire-shaped conductive line and may be connected to the electrode control portion (not shown). In an embodiment, the conductive portion (not shown) may be separately provided on an outside of the housing 151, and in another embodiment, may be integrally formed with one surface of the housing 151.

Although not shown in the drawings, in an embodiment, the electrode portion 152 may include three electrodes in the form of three phases.

Figure 4A:
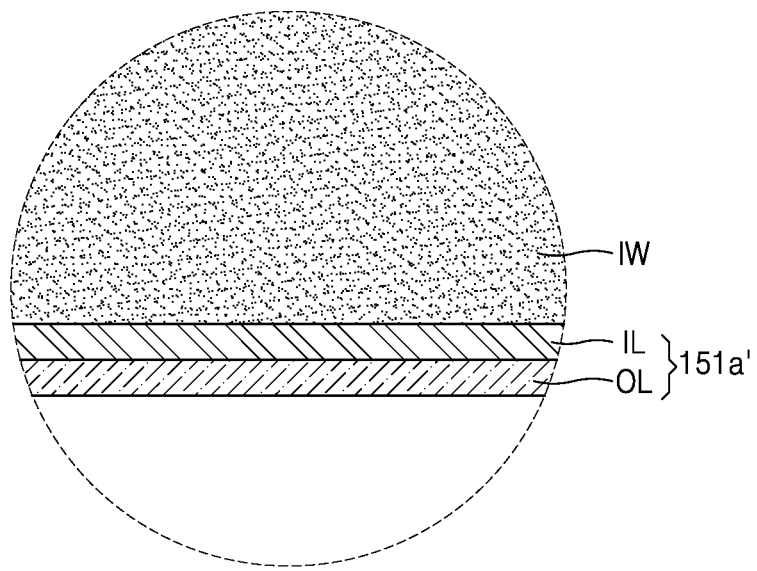
FIG. 4A is an enlarged view illustrating a modified example of portions of FIG. 2.
Figure 4B:
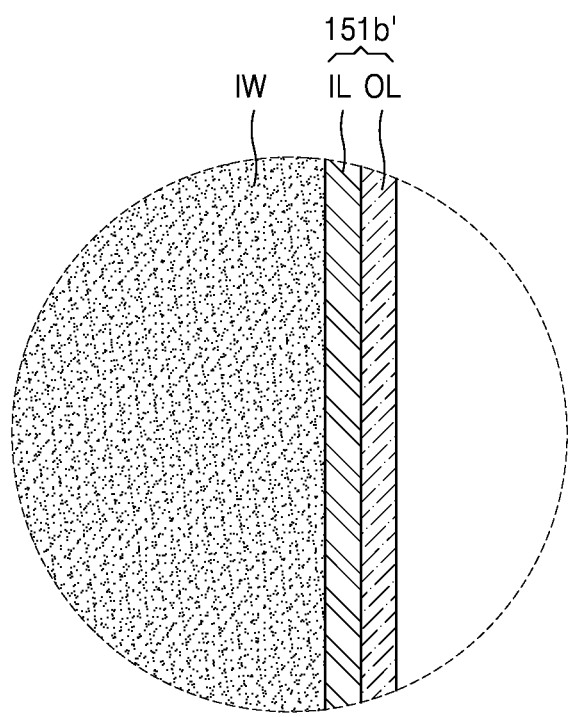
FIG. 4B is an enlarged view illustrating a modified example of portions of FIG. 2.
Figure 4C:
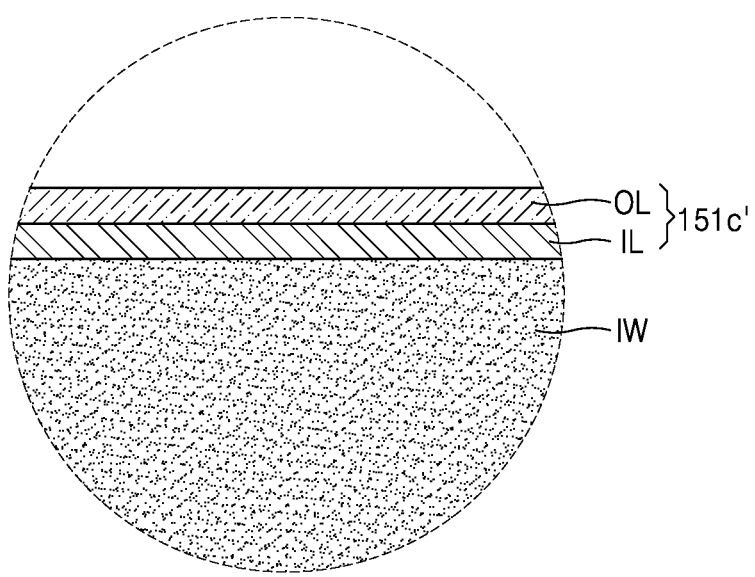
FIG. 4C is an enlarged view illustrating a modified example of portions of FIG. 2.

FIGS. 4A, 4B, and 4C are enlarged views respectively illustrating modified examples of portions K, L, and M of FIG. 2.

Referring to FIG. 4A, a bottom portion 151a' of the housing of the present embodiment may include an outer layer OL and an inner layer IL.

The outer layer OL may include various materials, for example, a durable material, and may include a metal material as an example.

In an embodiment, the outer layer OL may include an insulating material. For example, the outer layer OL may include a resin or a ceramic.

The inner layer IL may include an insulating material. For example, the inner layer IL may include an inorganic layer such as a ceramic material. In an embodiment, the inner layer IL may include an organic layer such as a resin layer.

Further, in an embodiment, the inner layer IL may include an insulating Teflon layer.

Further, in an embodiment, the inner layer IL may include an antistatic Teflon resin layer.

Referring to FIG. 4B, a side surface portion 151b' of the housing of the present embodiment may include an outer layer OL and an inner layer IL.

The outer layer OL may include various materials, for example, a durable material, and may include a metal material as an example.

In an embodiment, the outer layer OL may include an insulating material. For example, the outer layer OL may include a resin or a ceramic.

The inner layer IL may include an insulating material. For example, the inner layer IL may include an inorganic layer such as a ceramic material. In an embodiment, the inner layer IL may include an organic layer such as a resin layer.

Further, in an embodiment, the inner layer IL may include an insulating Teflon layer.

Further, in an embodiment, the inner layer IL may include an antistatic Teflon resin layer.

Referring to FIG. 4C, an upper surface portion 151c' of the housing of the present embodiment may include an outer layer OL and an inner layer IL.

The outer layer OL may include various materials, for example, a durable material, and may include a metal material as an example.

In an embodiment, the outer layer OL may include an insulating material. For example, the outer layer OL may include a resin or a ceramic.

The inner layer IL may include an insulating material. For example, the inner layer IL may include an inorganic layer such as a ceramic material. In an embodiment, the inner layer IL may include an organic layer such as a resin layer.

Further, in an embodiment, the inner layer IL may include an insulating Teflon layer.

Further, in an embodiment, the inner layer IL may include an antistatic Teflon resin layer.

An electric heating pot of the present embodiment may heat an electrolyzed water by controlling current applied to electrodes of an electrode portion of a heating unit. Heat of the electrolyzed water is transferred to a body unit to heat liquid in the body unit.

Accordingly, the liquid in the electric heating pot may be easily heated, thereby improving the convenience of a user. For example, hot water may be easily supplied to the user.

Further, selectively, the electrolyzed water may be stably heated by easily controlling the current applied to the electrodes of the electrode portion.

Further, a housing or at least an inner space of the housing, in which the electrolyzed water is disposed, may include an insulating material to reduce or block the leakage of current to the outside, thereby realizing a safe and high-efficiency electric heating pot.

Further, the electrolyzed water is heated, and the liquid in the body unit is heated through the heat of the electrolyzed water, so that the risk that may occur by directly heating the liquid in the body unit may be reduced at the electric heating pot.

Figure 5:
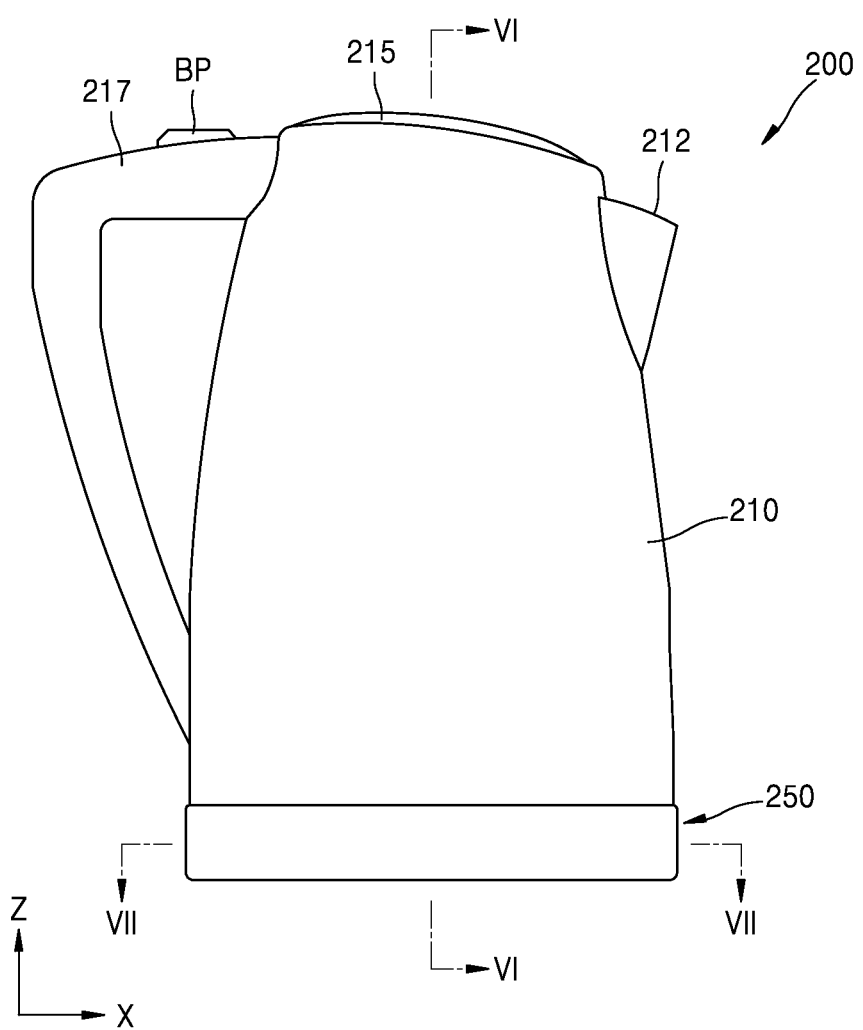
FIG. 5 is a schematic front view illustrating an electric heating pot according to another embodiment of the present disclosure.
Figure 6:
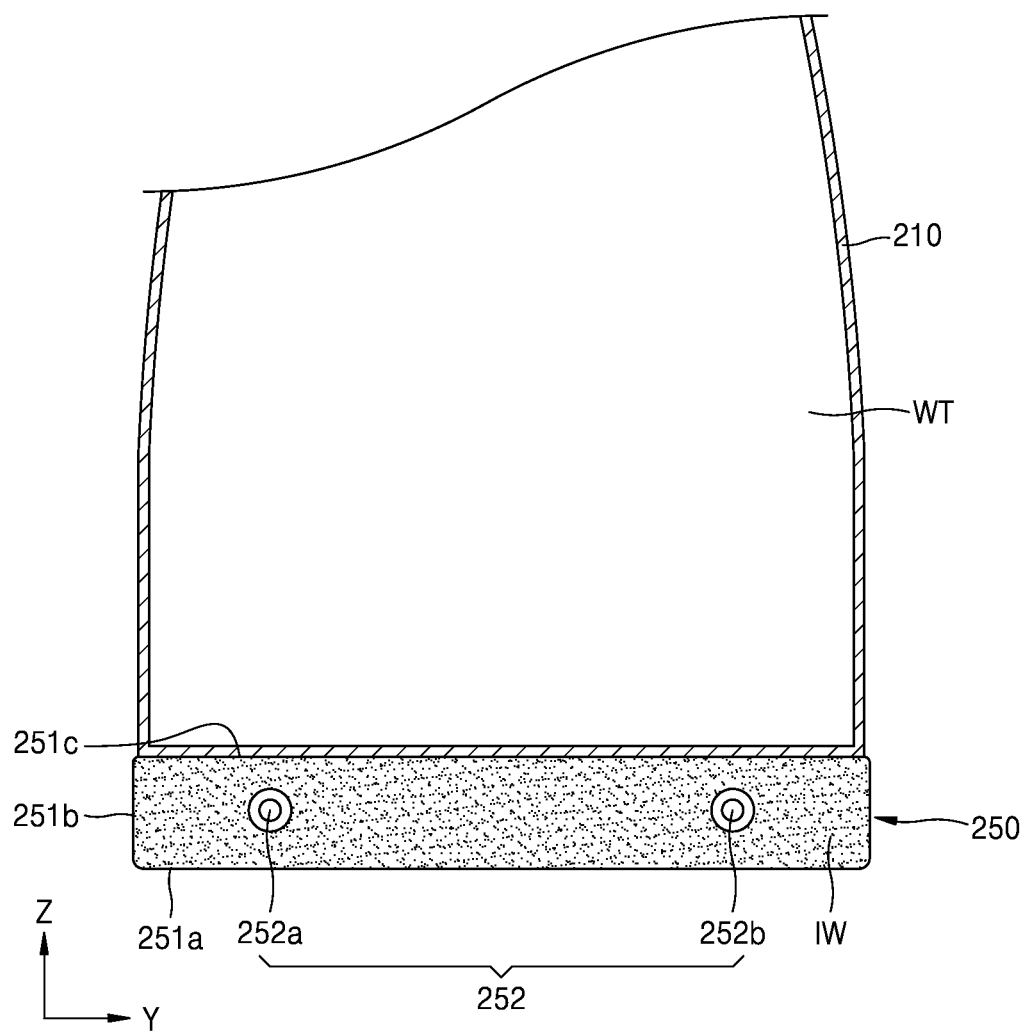
FIG. 6 is a cross-sectional view taken along line VI-VI of FIG. 5.
Figure 7:
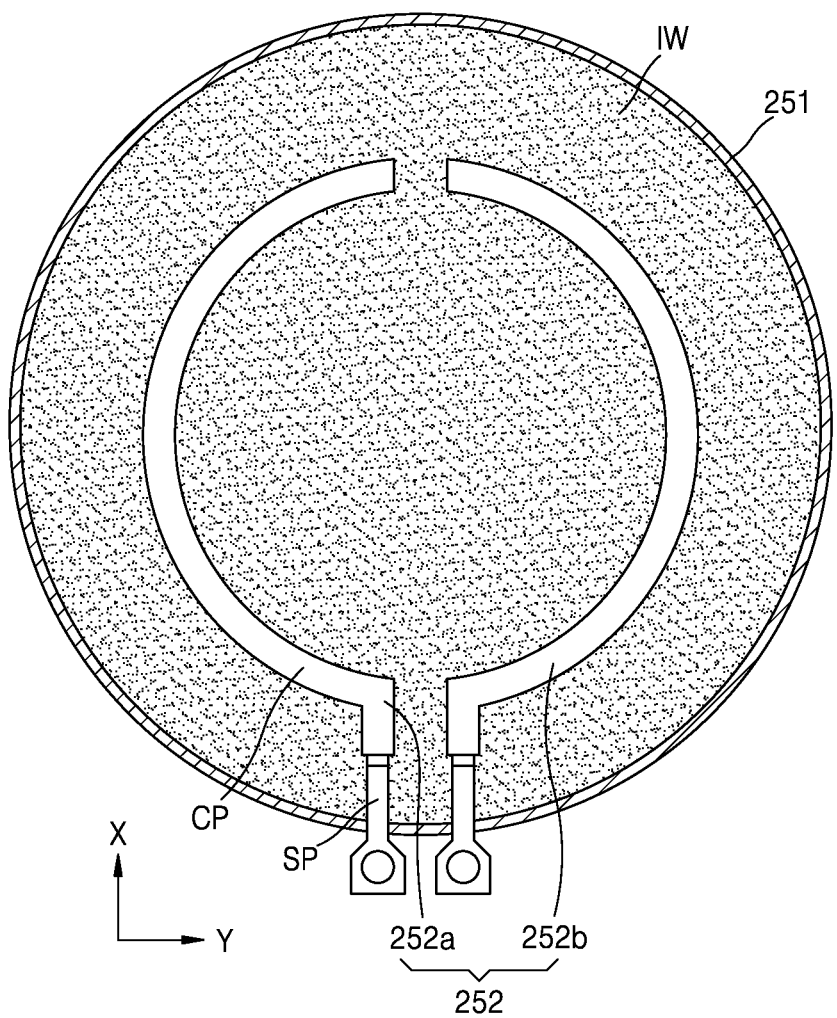
FIG. 7 is a cross-sectional view taken along line VII-VII of FIG. 5.

FIG. 5 is a schematic front view illustrating an electric heating pot according to another embodiment of the present disclosure, FIG. 6 is a cross-sectional view taken along line VI-VI of FIG. 5, and FIG. 7 is a cross-sectional view taken along line VII-VII of FIG. 5.

Referring to FIGS. 5 to 7, an electric heating pot 200 of the present embodiment may include a body unit 210 and a heating unit 250.

The body unit 210 may be disposed to be adjacent to the heating unit 250 in one direction. For example, the body unit 210 may be disposed to be adjacent to the heating unit 250 in a length direction of the body unit 210.

In an embodiment, the body unit 210 and the heating unit 250 may be formed to be connected to each other. For example, the body unit 210 and the heating unit 250 may be integrally formed. In addition, the body unit 210 and the heating unit 250 may be in contact with each other or may be integrally formed with an intermediate member further disposed therebetween.

In an embodiment, the body unit 210 and the heating unit 250 may be formed to be separable from each other.

The body unit 210 may include an accommodation space configured to accommodate a liquid WT. The liquid WT may include various types of liquids, and may include various types of liquids that may be heated by the heating unit 250. For example, the liquid WT may include water, and in this case, the electric heating pot 200 may be used by a user to heat water.

In an embodiment, a discharge outlet 212, through which the liquid WT is discharged from the accommodation space of the body unit 210 by an operation such as pouring the liquid WT, may be formed to be connected to the accommodation space of the body unit 210.

In an embodiment, a handle 217 may be formed on one region of the body unit 210 so that the electric heating pot 200 may be easily handled. In addition, one or more button members BP may be formed on the handle 217 so that the user selectively controls the operation of the electric heating pot 200. The button member BP may be a button having a form physically separated from the handle 217. In an embodiment, the button member BP may include a button shape displayed on a display portion (not shown).

The heating unit 250 may be configured to provide heat to the body unit 210. For example, the heating unit 250 may be configured to heat the liquid WT accommodated in the accommodation space of the body unit 210.

The heating unit 250 may include a housing 251 and an electrode portion 252.

The housing 251 may be formed to accommodate an electrolyzed water IW. The electrolyzed water IW may include various types of electrolyzed water. For example, the electrolyzed water IW may include an electrolyte solution. In an embodiment, the electrolyzed water IW may include distilled water, filtered water, mineral water, tap water, and the like in which at least one of various types of electrolyte solutions is appropriately diluted.

As an electrolyte material included in the electrolyzed water IW, there are various types including rust inhibitors or the like that contain edible soda, chlorite, silicate, an inorganic material of polyphosphate, amines, oxy acids, or the like as main components.

The housing 151 of the above-described embodiment may be applied to the housing 251 in the same or similar manner, and in an embodiment, the structure described with reference to FIGS. 4A to 4C may be applied to the housing 251. A detailed description thereof is the same as that given above, and thus, will be omitted.

The electrode portion 252 may be disposed in the housing 251, may be formed such that at least one region thereof is in contact with the electrolyzed water IW in the housing, and may include a plurality of electrodes.

For example, the electrode portion 252 may include a first electrode 252a and a second electrode 252b.

Each of the first electrode 252a and the second electrode 252b may be formed to be in contact with the electrolyzed water IW in the housing 251. Although not shown in the drawings, current may be applied to the first electrode 252a and the second electrode 252b under the control of an electrode control portion (not shown), and the applied current may be controlled through the electrode control portion (not shown).

The electrolyzed water IW in the housing 251 may be heated due the current applied to the first electrode 252a and the second electrode 252b of the electrode portion 252. Heat of the electrolyzed water IW may be transferred to the body unit 210 to heat the liquid WT in the accommodation space.

The first electrode 252a and the second electrode 252b may be formed to be spaced apart from each other by a predetermined interval.

The first electrode 252a and the second electrode 252b may each include a curved region.

When the first electrode 252a is described as an example, the first electrode 252a may include a curved region CP. In an embodiment, the first electrode 252a may include a linear region SP that is connected to the curved region CP and includes a pull-out region.

In an embodiment, the curved region CP may include a curved region having a shape corresponding to an edge of the housing 251 and may have a semi-circular or arc shape.

The second electrode 252b may include a curved region. In an embodiment, the second electrode 252b may have a shape symmetrical to that of the first electrode 252a.

Due to the shapes of the first electrode 252a and the second electrode 252b, a contact area between the electrode portion 252 and the electrolyzed water IW may be increased, and the performance of uniformly heating the electrolyzed water IW in the housing 251 may be improved.

An end portion of the curved region of each of the first electrode 252a and the second electrode 252b may be formed to be spaced apart from a region of the housing 251, for example, a side surface portion 251b of the housing 251.

Further, in an embodiment, the first electrode 252a and the second electrode 252b may be formed to be spaced apart from a bottom portion 251a and an upper surface portion 251c of the housing 251.

Further, a conductive portion (not shown) connected to one region of each of the first electrode 252a and the second electrode 252b may be included so that current is applied to the first electrode 252a and the second electrode 252b therethrough. The conductive portion (not shown) may be a wire-shaped conductive line and may be connected to the electrode control portion (not shown). In an embodiment, the conductive portion (not shown) may be separately provided on an outside of the housing 251, and in another embodiment, may be integrally formed with one surface of the housing 251.

Although not shown in the drawings, in an embodiment, the electrode portion 252 may include three electrodes in the form of three phases.

Figure 8:
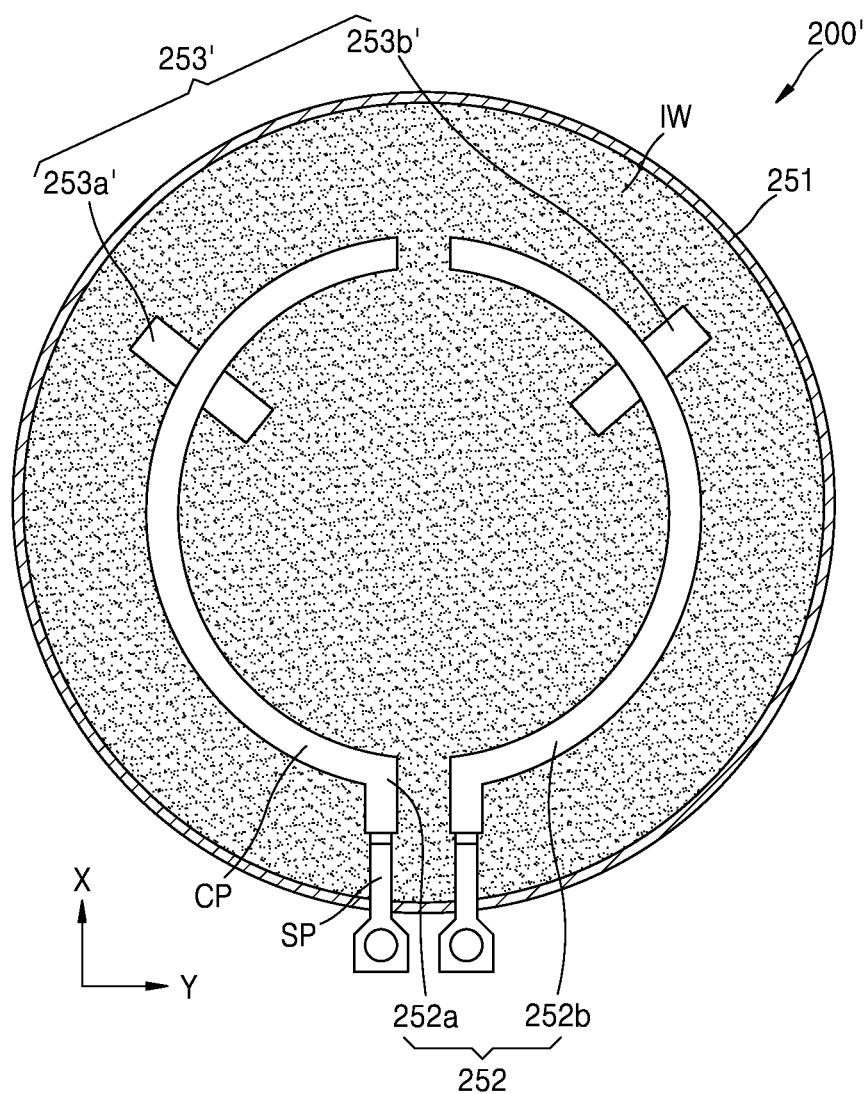
FIG. 8 is a view illustrating a modified example of FIG. 7.

FIG. 8 is a view illustrating a modified example of FIG. 7.

Referring to FIG. 8, an electric heating pot 200' may include a body unit (not shown) and a heating unit.

The heating unit may include a support portion 253'. For example, the electric heating pot 200' of FIG. 8 may have a form in which the support portion 253' is further added to the electric heating pot 200 of FIGS. 5 to 7.

The support portion 253' may be configured to support the electrode portion 252.

For example, the support portion 253' may include a first support member 253a' and a second support member 253b'.

The first support member 253a' may be configured to support the first electrode 252a, and the second support member 253b' may be configured to support the second electrode 252b.

In an embodiment, the first electrode 252a may be fixed to the first support member 253a', and the second electrode 252b may be fixed to the second support member 253b'. To this end, a separate fastening or bonding member may be used.

The support portion 253' may be disposed on one surface of the housing 251, and for example, may be connected to the bottom portion 251a of the housing 251. In an embodiment, the support portion 253' may be fixed to the bottom portion 251a.

The support portion 253' may include a highly durable material, and may include, for example, a resin-based material.

Further, in an embodiment, the support portion 253' may include a metal material.

An electric heating pot of the present embodiment may heat an electrolyzed water by controlling current applied to electrodes of an electrode portion of a heating unit. Heat of the electrolyzed water is transferred to a body unit to heat liquid in the body unit.

Accordingly, the liquid in the electric heating pot may be easily heated, thereby improving the convenience of a user. For example, hot water may be easily supplied to the user.

Further, selectively, the electrolyzed water may be stably heated by easily controlling the current applied to the electrodes of the electrode portion. Each of a first electrode and a second electrode of the electrode portion includes a curved region to increase a contact area with the electrolyzed water, so that a heating efficiency for the electrolyzed water may be improved. As a result, the liquid in the body unit may be easily heated, so that the efficiency of the electric heating pot may be improved and power consumption may be reduced.

Further, in an embodiment, a support portion capable of supporting each of the first electrode and the second electrode is further included so that the first electrode and the second electrode may be easily and stably disposed even when the electric heating pot is moved or shaken, thereby reducing damage or deformation of the electrode portion and stably heating the electrolyzed water.

Further, a housing or at least an inner space of the housing, in which the electrolyzed water is disposed, may include an insulating material to reduce or block the leakage of current to the outside, thereby realizing a safe and high-efficiency electric heating pot.

Further, the electrolyzed water is heated, and the liquid in the body unit is heated through the heat of the electrolyzed water, so that the risk that may occur by directly heating the liquid in the body unit may be reduced at the electric heating pot.

Figure 9:
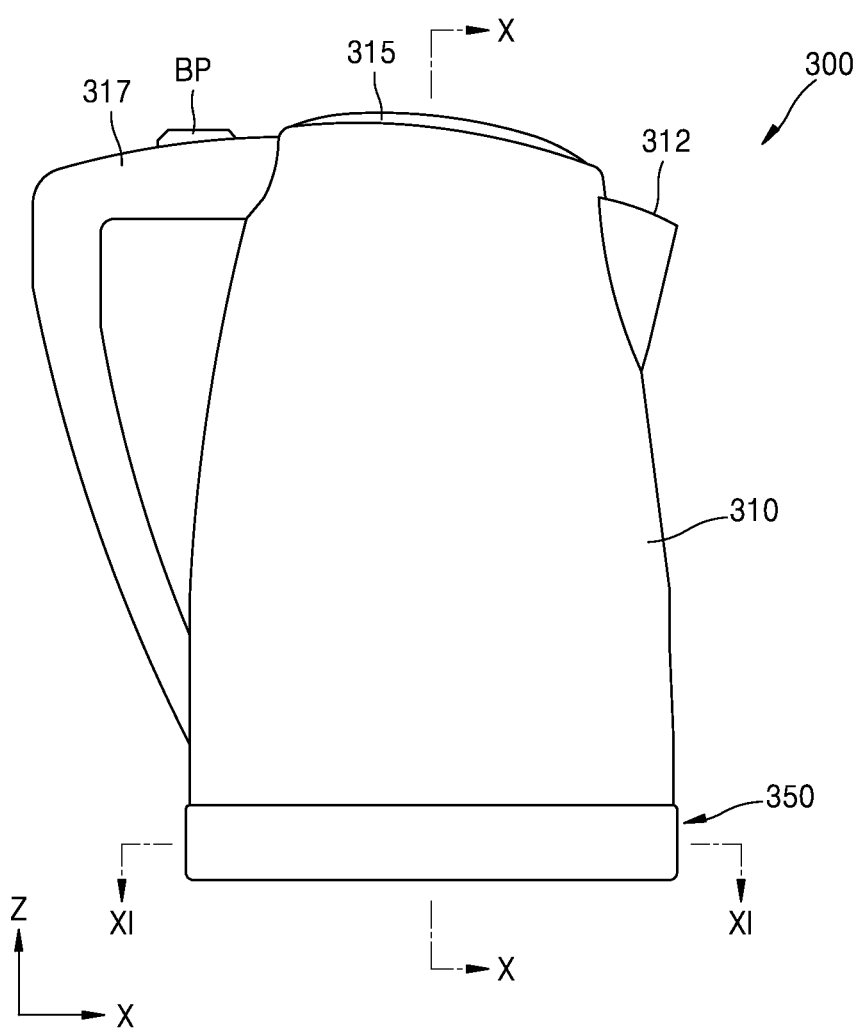
FIG. 9 is a schematic front view illustrating an electric heating pot according to another embodiment of the present disclosure.
Figure 10:
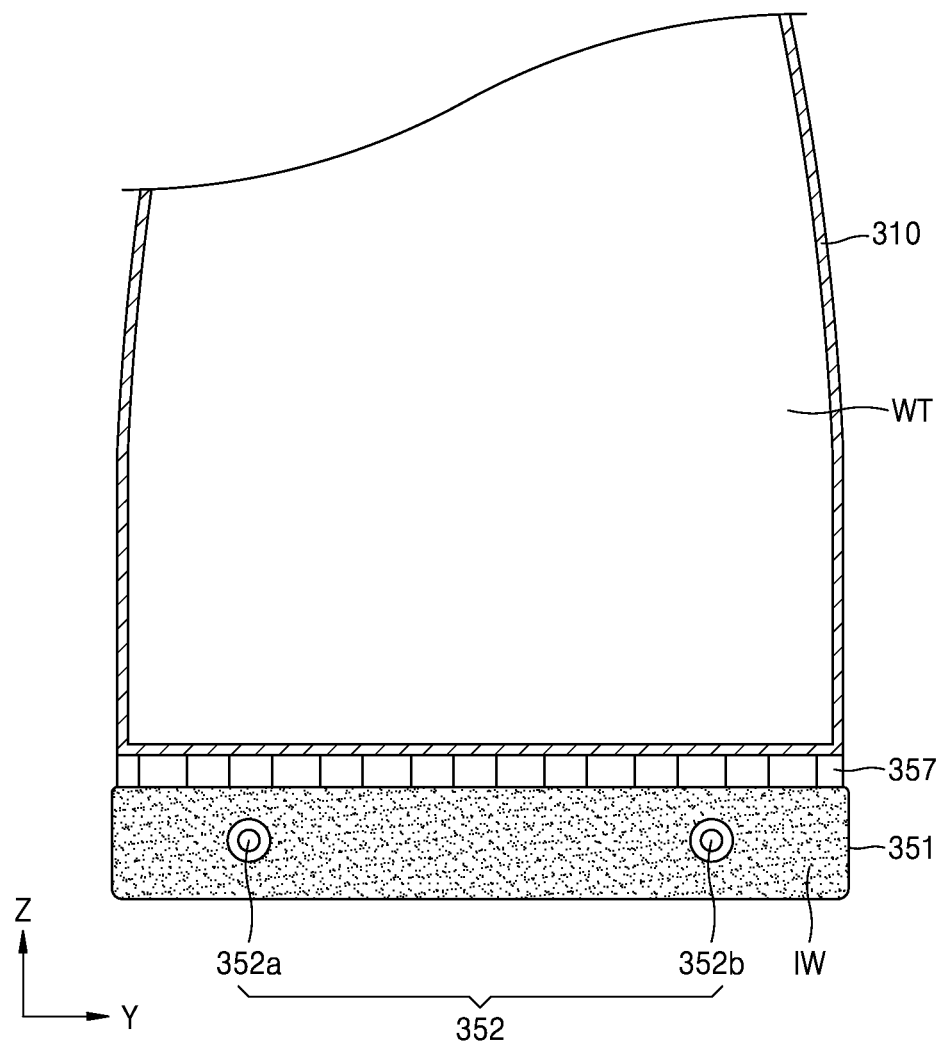
FIG. 10 is a cross-sectional view taken along line X-X of FIG. 9.
Figure 11:
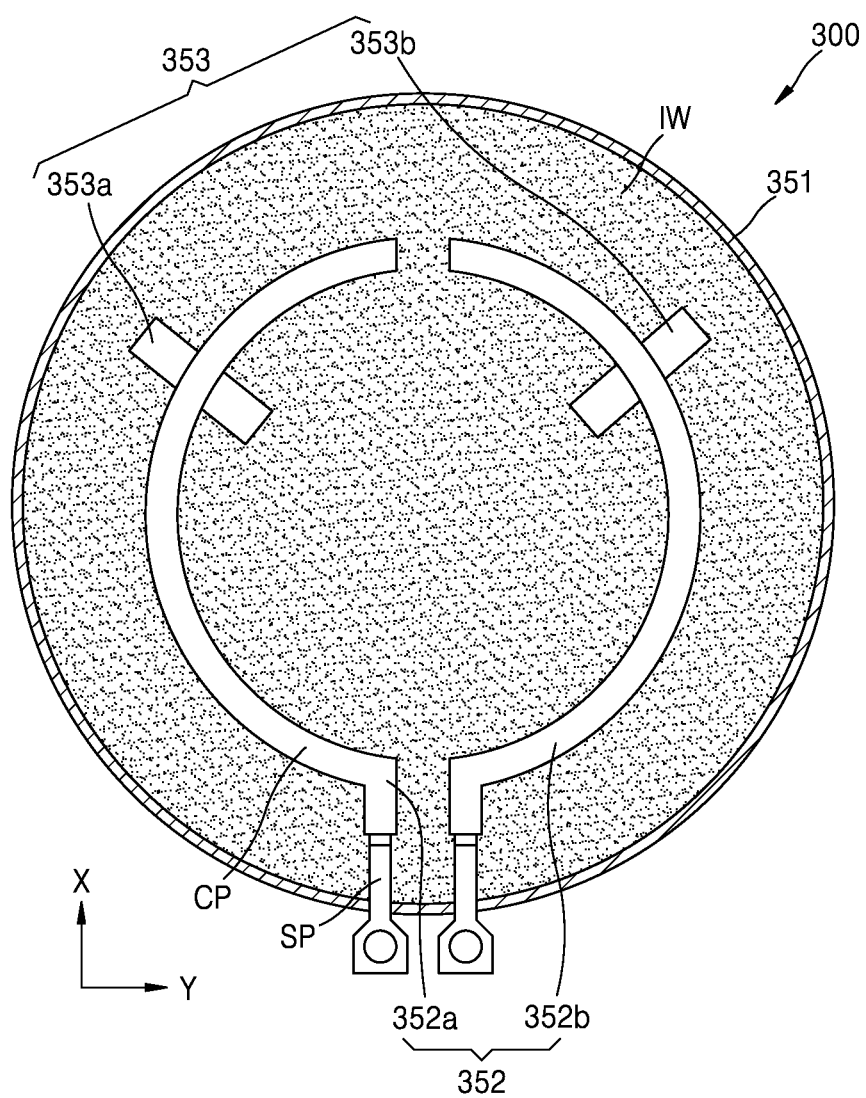
FIG. 11 is a cross-sectional view taken along line XI-XI of FIG. 9.

FIG. 9 is a schematic front view illustrating an electric heating pot according to another embodiment of the present disclosure, FIG. 10 is a cross-sectional view taken along line X-X of FIG. 9, and FIG. 11 is a cross-sectional view taken along line XI-XI of FIG. 9.

Referring to FIGS. 9 to 11, an electric heating pot 300 of the present embodiment may include a body unit 310 and a heating unit 350.

The body unit 310 may be disposed to be adjacent to the heating unit 350 in one direction. For example, the body unit 310 may be disposed to be adjacent to the heating unit 350 in a length direction of the body unit 310.

In an embodiment, the body unit 310 and the heating unit 350 may be formed to be connected to each other. For example, the body unit 310 and the heating unit 350 may be integrally formed. In addition, the body unit 310 and the heating unit 350 may be in contact with each other or may be integrally formed with an intermediate member further disposed therebetween.

In an embodiment, the body unit 310 and the heating unit 350 may be formed to be separable from each other.

The body unit 310 may include an accommodation space configured to accommodate a liquid WT. The liquid WT may include various types of liquids, and may include various types of liquids that may be heated by the heating unit 350. For example, the liquid WT may include water, and in this case, the electric heating pot 300 may be used by a user to heat water.

In an embodiment, a discharge outlet 312, through which the liquid WT is discharged from the accommodation space of the body unit 310 by an operation such as pouring the liquid WT, may be formed to be connected to the accommodation space of the body unit 310.

In an embodiment, a handle 317 may be formed on one region of the body unit 310 so that the electric heating pot 300 may be easily handled. In addition, one or more button members BP may be formed on the handle 317 so that the user selectively controls the operation of the electric heating pot 300. The button member BP may be a button having a form physically separated from the handle 317. In an embodiment, the button member BP may include a button shape displayed on a display portion (not shown).

The heating unit 350 may be configured to provide heat to the body unit 310. For example, the heating unit 350 may be configured to heat the liquid WT accommodated in the accommodation space of the body unit 310.

The heating unit 350 may include a housing 351 and an electrode portion 352.

The housing 351 may be formed to accommodate an electrolyzed water IW. The electrolyzed water IW may include various types of electrolyzed water. For example, the electrolyzed water IW may include an electrolyte solution. In an embodiment, the electrolyzed water IW may include distilled water, filtered water, mineral water, tap water, and the like in which at least one of various types of electrolyte solutions is appropriately diluted.

As an electrolyte material included in the electrolyzed water IW, there are various types including rust inhibitors or the like that contain edible soda, chlorite, silicate, an inorganic material of polyphosphate, amines, oxyacids, or the like as main components.

The housing 151 of the above-described embodiment may be applied to the housing 351 in the same or similar manner, and in an embodiment, the structure described with reference to FIGS. 4A to 4C may be applied to the housing 351.

In the present embodiment, an insulating layer 357 may be further formed between the housing 351 and the body unit 310.

The insulating layer 357 may include various insulating materials, and may include, for example, a ceramic material.

In an embodiment, the insulating layer 357 may be formed by performing ceramic coating on an upper surface of the housing 351.

In an embodiment, the insulating layer 357 may also be formed using an organic insulating material.

The electrode portion 352 may be disposed in the housing 351, may be formed such that at least one region thereof is in contact with the electrolyzed water IW in the housing, and may include a plurality of electrodes.

For example, the electrode portion 352 may include a first electrode 352a and a second electrode 352b.

Each of the first electrode 352a and the second electrode 352b may be formed to be in contact with the electrolyzed water IW in the housing 351. Although not shown in the drawings, current may be applied to the first electrode 352a and the second electrode 352b under the control of an electrode control portion (not shown), and the applied current may be controlled through the electrode control portion (not shown).

The electrolyzed water IW in the housing 351 may be heated due the current applied to the first electrode 352a and the second electrode 352b of the electrode portion 352. Heat of the electrolyzed water IW may be transferred to the body unit 310 to heat the liquid WT in the accommodation space.

The first electrode 352a and the second electrode 352b may be formed to be spaced apart from each other by a predetermined interval.

The first electrode 352a and the second electrode 352b may each include a curved region.

When the first electrode 352a is described as an example, the first electrode 352a may include a curved region CP. In an embodiment, the first electrode 352a may include a linear region SP that is connected to the curved region CP and includes a pull-out region.

In an embodiment, the curved region CP may include a curved region having a shape corresponding to an edge of the housing 351 and may have a semi-circular or arc shape.

The second electrode 352b may include a curved region. In an embodiment, the second electrode 352b may have a shape symmetrical to that of the first electrode 352a.

Due to the shapes of the first electrode 352a and the second electrode 352b, a contact area between the electrode portion 352 and the electrolyzed water IW may be increased, and the performance of uniformly heating the electrolyzed water IW in the housing 351 may be improved.

An end portion of the curved region of each of the first electrode 352a and the second electrode 352b may be formed to be spaced apart from a region of the housing 351, for example, a side surface portion of the housing 351.

Further, in an embodiment, the first electrode 352a and the second electrode 352b may be formed to be spaced apart from a bottom portion and an upper surface portion of the housing 351.

Further, a conductive portion (not shown) connected to one region of each of the first electrode 352a and the second electrode 352b may be included so that current is applied to the first electrode 352a and the second electrode 352b therethrough. The conductive portion (not shown) may be a wire-shaped conductive line and may be connected to the electrode control portion (not shown). In an embodiment, the conductive portion (not shown) may be separately provided on an outside of the housing 351, and in another embodiment, may be integrally formed with one surface of the housing 351.

Although not shown in the drawings, in an embodiment, the electrode portion 352 may include three electrodes in the form of three phases.

In an embodiment, a support portion 353 may be configured to support the electrode portion 352.

For example, the support portion 353 may include a first support member 353a and a second support member 353b.

The first support member 353a may be configured to support the first electrode 352a, and the second support member 353b may be configured to support the second electrode 352b.

In an embodiment, the first electrode 352a may be fixed to the first support member 353a, and the second electrode 352b may be fixed to the second support member 353b. To this end, a separate fastening or bonding member may be used.

The support portion 353 may be disposed on one surface of the housing 351, and for example, may be connected to a bottom portion 351a of the housing 351. In an embodiment, the support portion 353 may be fixed to the bottom portion 351a.

The support portion 353 may include a highly durable material, and may include, for example, a resin-based material.

Further, in an embodiment, the support portion 353 may include a metal material.

An electric heating pot of the present embodiment may heat an electrolyzed water by controlling current applied to electrodes of an electrode portion of a heating unit. Heat of the electrolyzed water is transferred to a body unit to heat liquid in the body unit.

Accordingly, the liquid in the electric heating pot may be easily heated, thereby improving the convenience of a user. For example, hot water may be easily supplied to the user.

Further, selectively, the electrolyzed water may be stably heated by easily controlling the current applied to the electrodes of the electrode portion. Each of a first electrode and a second electrode of the electrode portion includes a curved region to increase a contact area with the electrolyzed water, so that a heating efficiency for the electrolyzed water may be improved. As a result, the liquid in the body unit may be easily heated, so that the efficiency of the electric heating pot may be improved and power consumption may be reduced.

Further, an insulating layer may be formed between the housing of the heating unit and the body unit, and accordingly, current in the heating unit, for example, current through the electrolyzed water in the housing may be reduced or blocked from being transmitted to the body unit, and the safety of the user may be increased.

Further, in an embodiment, a support portion capable of supporting each of the first electrode and the second electrode is further included so that the first electrode and the second electrode may be easily and stably disposed even when the electric heating pot is moved or shaken, thereby reducing damage or deformation of the electrode portion and stably heating the electrolyzed water.

Further, a housing or at least an inner space of the housing, in which the electrolyzed water is disposed, may include an insulating material to reduce or block the leakage of current to the outside, thereby realizing a safe and high-efficiency electric heating pot.

Further, the electrolyzed water is heated, and the liquid in the body unit is heated through the heat of the electrolyzed water, so that the risk that may occur by directly heating the liquid in the body unit may be reduced at the electric heating pot.

Figure 12:
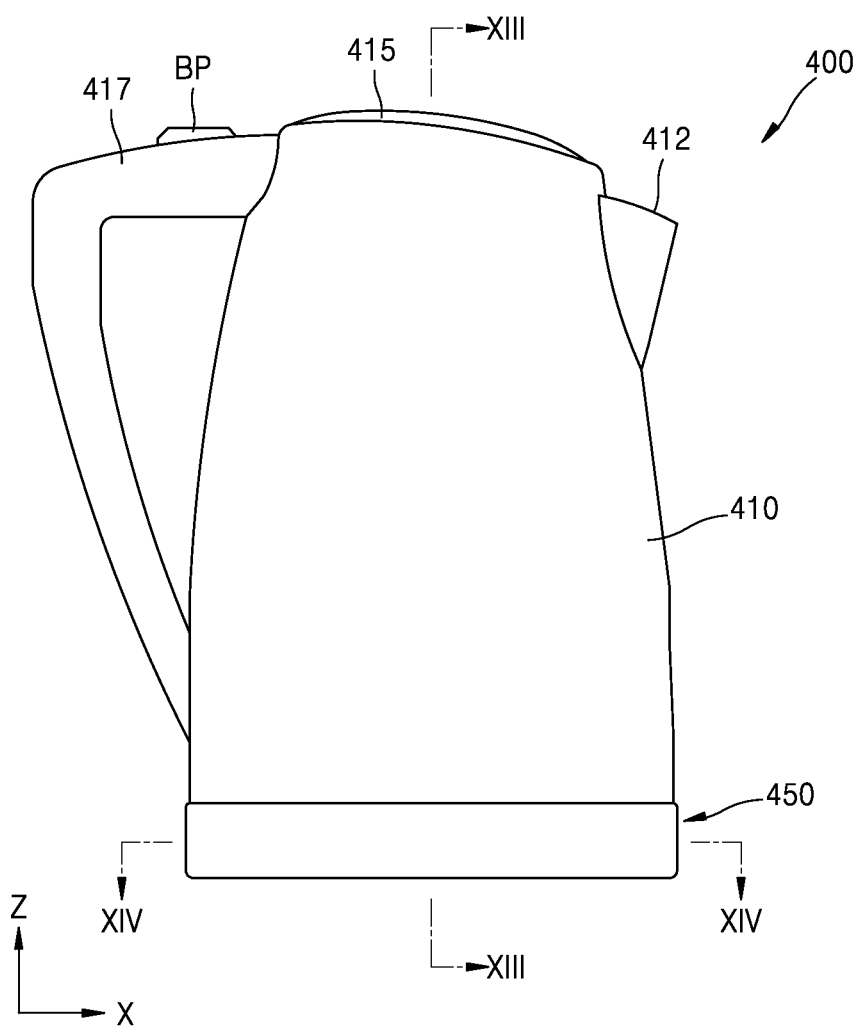
FIG. 12 is a schematic front view illustrating an electric heating pot according to another embodiment of the present disclosure.
Figure 13:
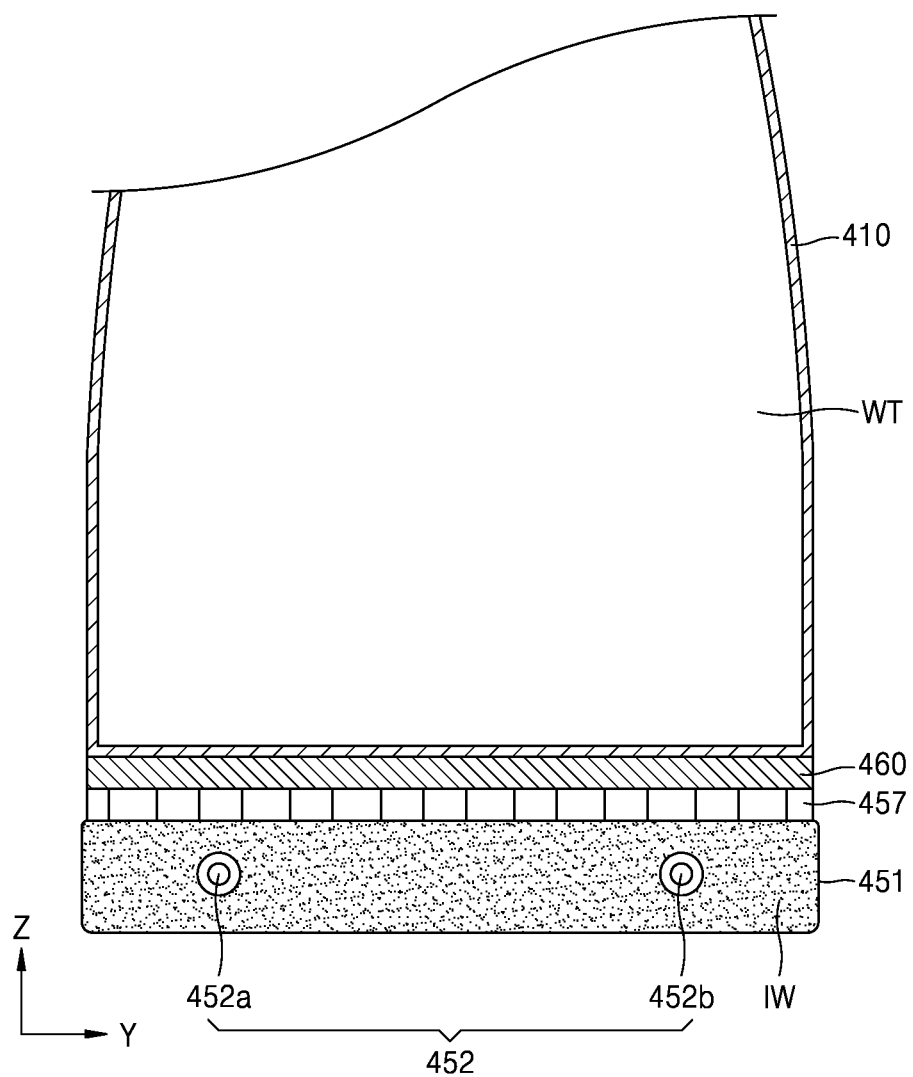
FIG. 13 is a cross-sectional view taken along line XIII-XIII of FIG. 12.
Figure 14:
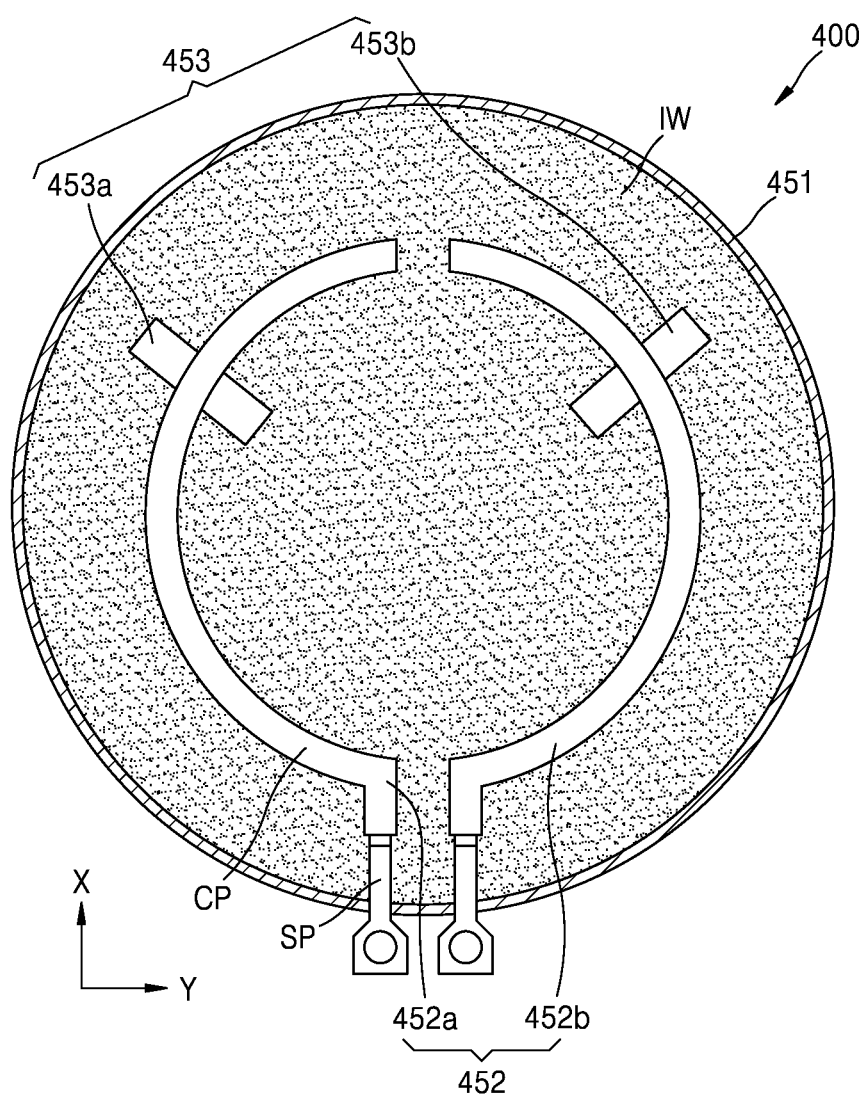
FIG. 14 is a cross-sectional view taken along line XIV-XIV of FIG. 12.

FIG. 12 is a schematic front view illustrating an electric heating pot according to another embodiment of the present disclosure, FIG. 13 is a cross-sectional view taken along line XIII-XIII of FIG. 12, and FIG. 14 is a cross-sectional view taken along line XIV-XIV of FIG. 12.

Referring to FIGS. 12 to 14, an electric heating pot 400 of the present embodiment may include a body unit 410 and a heating unit 450.

The body unit 410 may be disposed to be adjacent to the heating unit 450 in one direction. For example, the body unit 410 may be disposed to be adjacent to the heating unit 450 in a length direction of the body unit 410.

In an embodiment, the body unit 410 and the heating unit 450 may be formed to be connected to each other. For example, the body unit 410 and the heating unit 450 may be integrally formed. In addition, the body unit 410 and the heating unit 450 may be in contact with each other or may be integrally formed with an intermediate member further disposed therebetween.

In an embodiment, the body unit 410 and the heating unit 450 may be formed to be separable from each other.

The body unit 410 may include an accommodation space configured to accommodate a liquid WT. The liquid WT may include various types of liquids, and may include various types of liquids that may be heated by the heating unit 450. For example, the liquid WT may include water, and in this case, the electric heating pot 400 may be used by a user to heat water.

In an embodiment, a discharge outlet 412, through which the liquid WT is discharged from the accommodation space of the body unit 410 by an operation such as pouring the liquid WT, may be formed to be connected to the accommodation space of the body unit 410.

In an embodiment, a handle 417 may be formed on one region of the body unit 410 so that the electric heating pot 400 may be easily handled. In addition, one or more button members BP may be formed on the handle 417 so that the user selectively controls the operation of the electric heating pot 400. The button member BP may be a button having a form physically separated from the handle 417. In an embodiment, the button member BP may include a button shape displayed on a display portion (not shown).

The heating unit 450 may be configured to provide heat to the body unit 410. For example, the heating unit 450 may be configured to heat the liquid WT accommodated in the accommodation space of the body unit 410.

The heating unit 450 may include a housing 451 and an electrode portion 452.

The housing 451 may be formed to accommodate an electrolyzed water IW. The electrolyzed water IW may include various types of electrolyzed water. For example, the electrolyzed water IW may include an electrolyte solution. In an embodiment, the electrolyzed water IW may include distilled water, filtered water, mineral water, tap water, and the like in which at least one of various types of electrolyte solutions is appropriately diluted.

As an electrolyte material included in the electrolyzed water IW, there are various types including rust inhibitors or the like that contain edible soda, chlorite, silicate, an inorganic material of polyphosphate, amines, oxyacids, or the like as main components.

The housing 151 of the above-described embodiment may be applied to the housing 451 in the same or similar manner, and in an embodiment, the structure described with reference to FIGS. 4A to 4C may be applied to the housing 451.

In the present embodiment, an insulating layer 457 may be further formed between the housing 451 and the body unit 410.

The insulating layer 457 may include various insulating materials, and may include, for example, a ceramic material.

In an embodiment, the insulating layer 457 may be formed by performing ceramic coating on an upper surface of the housing 451.

In an embodiment, the insulating layer 457 may also be formed using an organic insulating material.

Further, in the present embodiment, a heat transfer portion 460 may be further formed between the housing 451 and the body unit 410.

The heat transfer portion 460 may include a metal material and may include, for example, a stainless steel-based material. In addition, in an embodiment, the heat transfer portion 460 may include aluminum, copper, or an alloy material thereof.

In an embodiment, the heat transfer portion 460 may be disposed between the insulating layer 457 and the body unit 410.

Further, the heat transfer portion 460 may be integrally formed with a bottom portion of the body unit 410.

Since the heat transfer portion 460 may easily transfer heat generated from the heating unit 450 to the body unit 410 and reduce heat dissipation to a side surface, in the electric heating pot 400, thermal efficiency may be improved and power consumption may be reduced.

Further, the heat transfer portion 460 may protect the bottom portion of the body unit 410, so that damage to the body unit 410 may be reduced and a service life may be increased.

The electrode portion 452 may be disposed in the housing 451, may be formed such that at least one region thereof is in contact with the electrolyzed water IW in the housing, and may include a plurality of electrodes.

For example, the electrode portion 452 may include a first electrode 452a and a second electrode 452b.

Each of the first electrode 452a and the second electrode 452b may be formed to be in contact with the electrolyzed water IW in the housing 451. Although not shown in the drawings, current may be applied to the first electrode 452a and the second electrode 452b under the control of an electrode control portion (not shown), and the applied current may be controlled through the electrode control portion (not shown).

The electrolyzed water IW in the housing 451 may be heated due the current applied to the first electrode 452a and the second electrode 452b of the electrode portion 452. Heat of the electrolyzed water IW may be transferred to the body unit 410 to heat the liquid WT in the accommodation space.

The first electrode 452a and the second electrode 452b may be formed to be spaced apart from each other by a predetermined interval.

The first electrode 452a and the second electrode 452b may each include a curved region.

When the first electrode 452a is described as an example, the first electrode 452a may include a curved region CP. In an embodiment, the first electrode 452a may include a linear region SP that is connected to the curved region CP and includes a pull-out region.

In an embodiment, the curved region CP may include a curved region having a shape corresponding to an edge of the housing 451 and may have a semi-circular or arc shape.

The second electrode 452b may include a curved region. In an embodiment, second electrode 452b may have a shape symmetrical to that of the first electrode 452a.

Due to the shapes of the first electrode 452a and the second electrode 452b, a contact area between the electrode portion 452 and the electrolyzed water IW may be increased, and the performance of uniformly heating the electrolyzed water IW in the housing 451 may be improved.

An end portion of the curved region of each of the first electrode 452*a* and the second electrode 452*b* may be formed to be spaced apart from a region of the housing 451, for example, a side surface portion of the housing 451.

Further, in an embodiment, the first electrode 452*a* and the second electrode 452*b* may be formed to be spaced apart from the bottom portion and an upper surface portion of the housing 451.

Further, a conductive portion (not shown) connected to one region of each of the first electrode 452*a* and the second electrode 452*b* may be included so that current is applied to the first electrode 452*a* and the second electrode 452*b* therethrough. The conductive portion (not shown) may be a wire-shaped conductive line and may be connected to the electrode control portion (not shown). In an embodiment, the conductive portion (not shown) may be separately provided on an outside of the housing 451, and in another embodiment, may be integrally formed with one surface of the housing 451.

Although not shown in the drawings, in an embodiment, the electrode portion 452 may include three electrodes in the form of three phases.

In an embodiment, a support portion 453 may be configured to support the electrode portion 452.

For example, the support portion 453 may include a first support member 453*a* and a second support member 453*b*.

The first support member 453*a* may be configured to support the first electrode 452*a*, and the second support member 453*b* may be configured to support the second electrode 452*b*.

In an embodiment, the first electrode 452*a* may be fixed to the first support member 453*a*, and the second electrode 452*b* may be fixed to the second support member 453*b*. To this end, a separate fastening or bonding member may be used.

The support portion 453 may be disposed on one surface of the housing 451, and for example, may be connected to a bottom portion 451*a* of the housing 451. In an embodiment, the support portion 453 may be fixed to the bottom portion 451*a*.

The support portion 453 may include a highly durable material, and may include, for example, a resin-based material.

Further, in an embodiment, the support portion 453 may include a metal material.

An electric heating pot of the present embodiment may heat an electrolyzed water by controlling current applied to electrodes of an electrode portion of a heating unit. Heat of the electrolyzed water is transferred to a body unit to heat liquid in the body unit.

Accordingly, the liquid in the electric heating pot may be easily heated, thereby improving the convenience of a user. For example, hot water may be easily supplied to the user.

Further, selectively, the electrolyzed water may be stably heated by easily controlling the current applied to the electrodes of the electrode portion. Each of a first electrode and a second electrode of the electrode portion includes a curved region to increase a contact area with the electrolyzed water, so that a heating efficiency for the electrolyzed water may be improved. As a result, the liquid in the body unit may be easily heated, so that the efficiency of the electric heating pot may be improved and power consumption may be reduced.

Further, an insulating layer may be formed between the housing of the heating unit and the body unit, and accordingly, current in the heating unit, for example, current through the electrolyzed water in the housing may be reduced or blocked from being transmitted to the body unit, and the safety of the user may be increased.

Further, a heat transfer portion may be formed between the housing of the heating unit and the body unit, and heat from the heating unit may be effectively transferred to the body unit through the heat transfer portion, thereby improving the thermal efficiency of the electric heating pot and reducing power consumption.

Further, in an embodiment, a support portion capable of supporting each of the first electrode and the second electrode is further included so that the first electrode and the second electrode may be easily and stably disposed even when the electric heating pot is moved or shaken, thereby reducing damage or deformation of the electrode portion and stably heating the electrolyzed water.

Further, a housing or at least an inner space of the housing, in which the electrolyzed water is disposed, may include an insulating material to reduce or block the leakage of current to the outside, thereby realizing a safe and high-efficiency electric heating pot.

Further, the electrolyzed water is heated, and the liquid in the body unit is heated through the heat of the electrolyzed water, so that the risk that may occur by directly heating the liquid in the body unit may be reduced at the electric heating pot.

Figure 15:
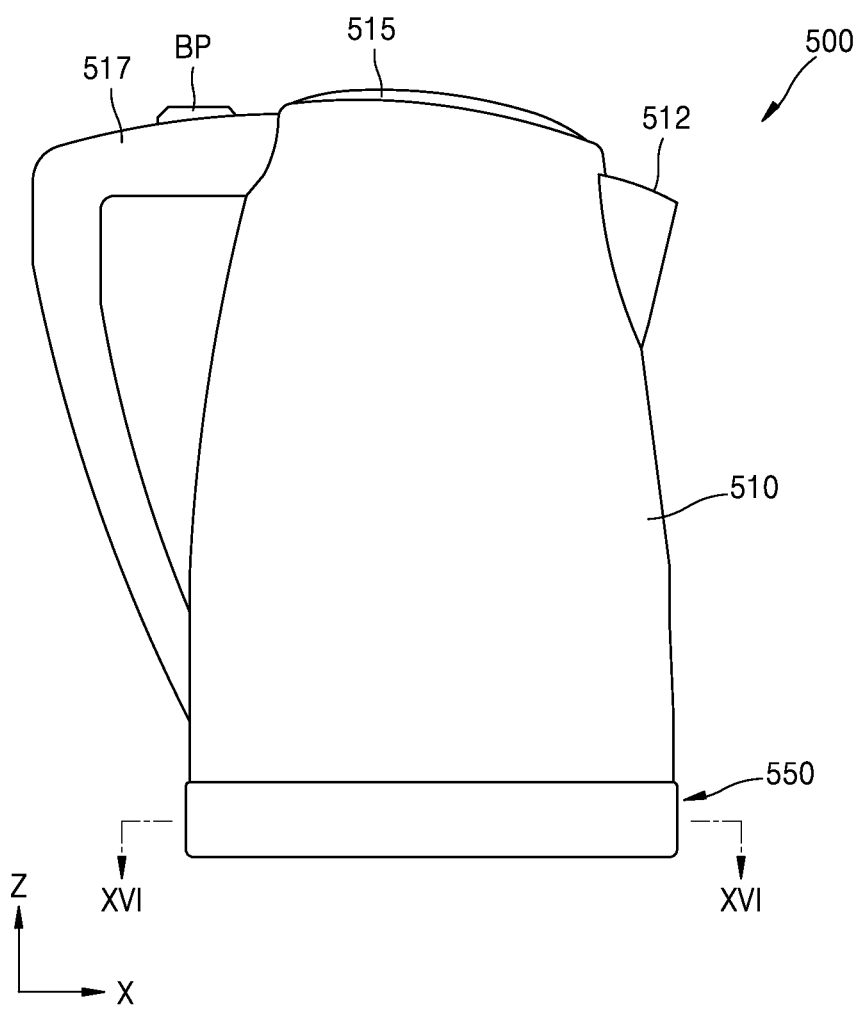
FIG. 15 is a schematic front view illustrating an electric heating pot according to another embodiment of the present disclosure.
Figure 16:
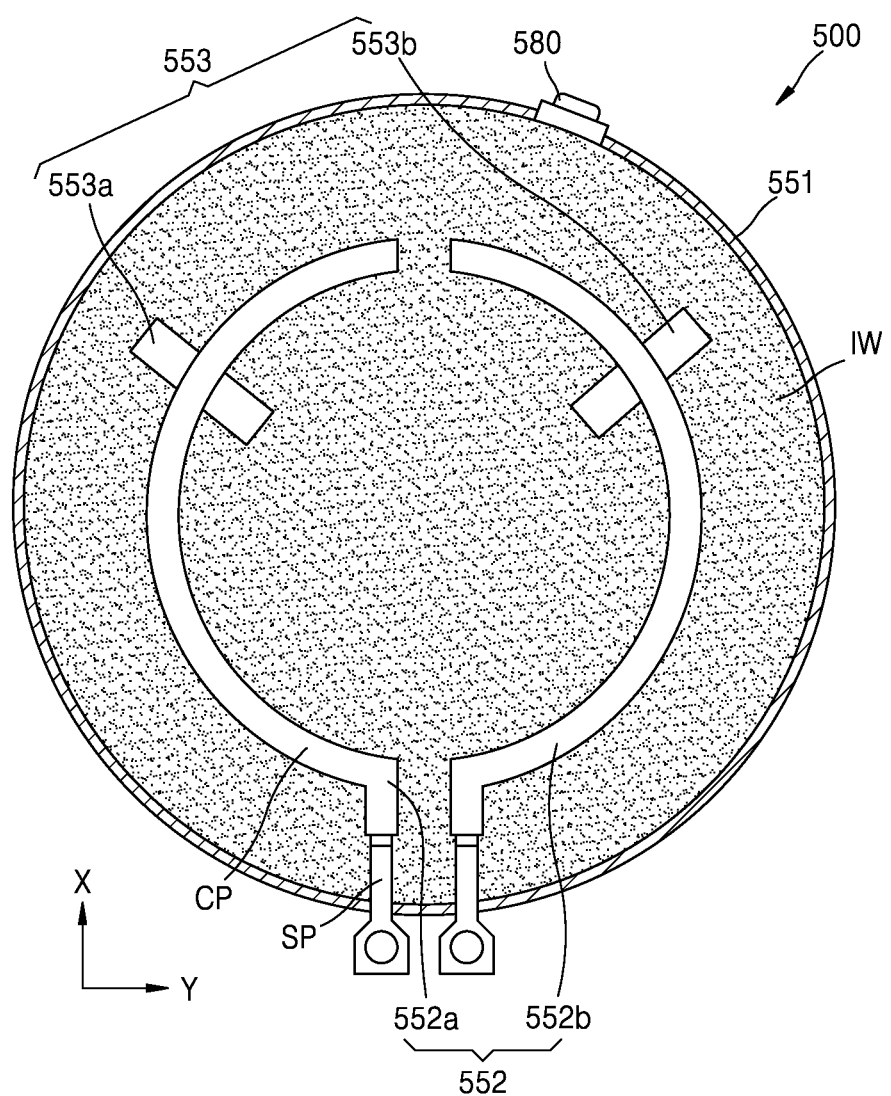
FIG. 16 is a cross-sectional view taken along line XVI-XVI of FIG. 15.
Figure 17A:
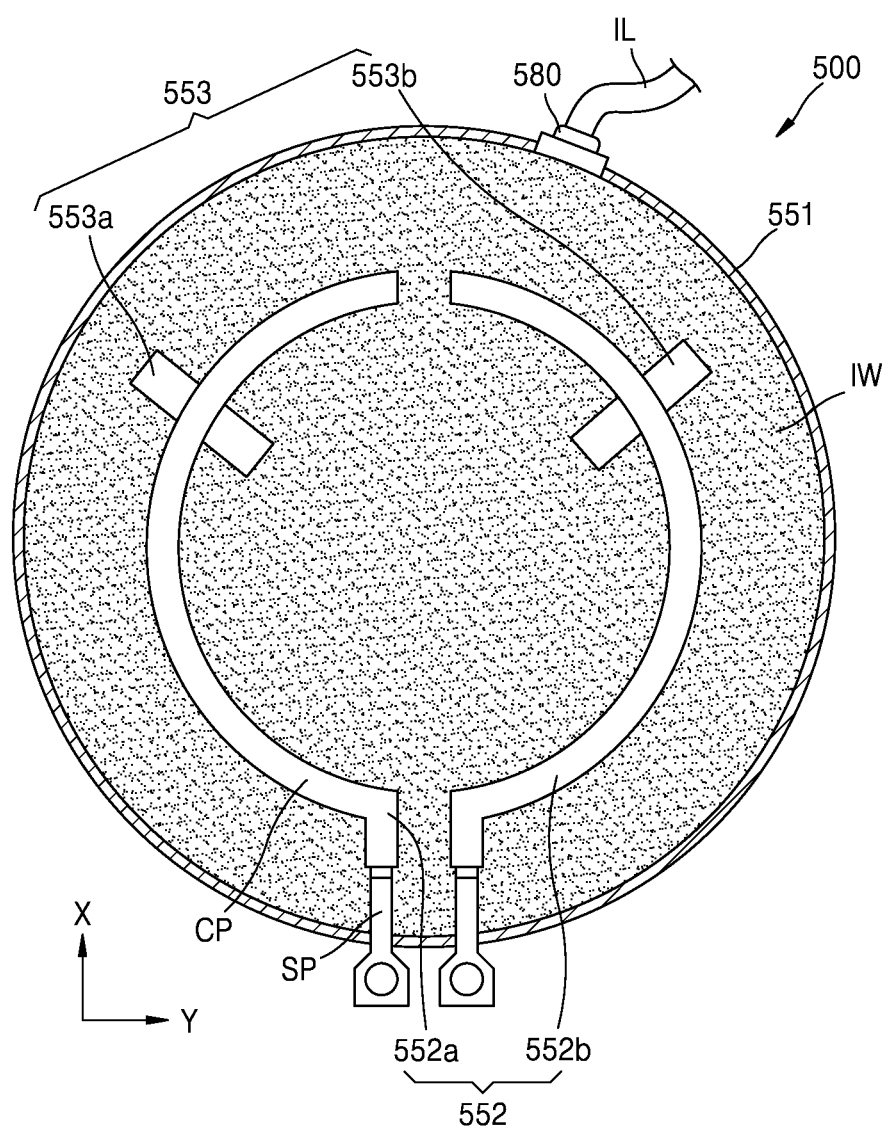
FIG. 17A is a view for describing an inlet portion of the electric heating pot of FIG. 15.
Figure 17B:
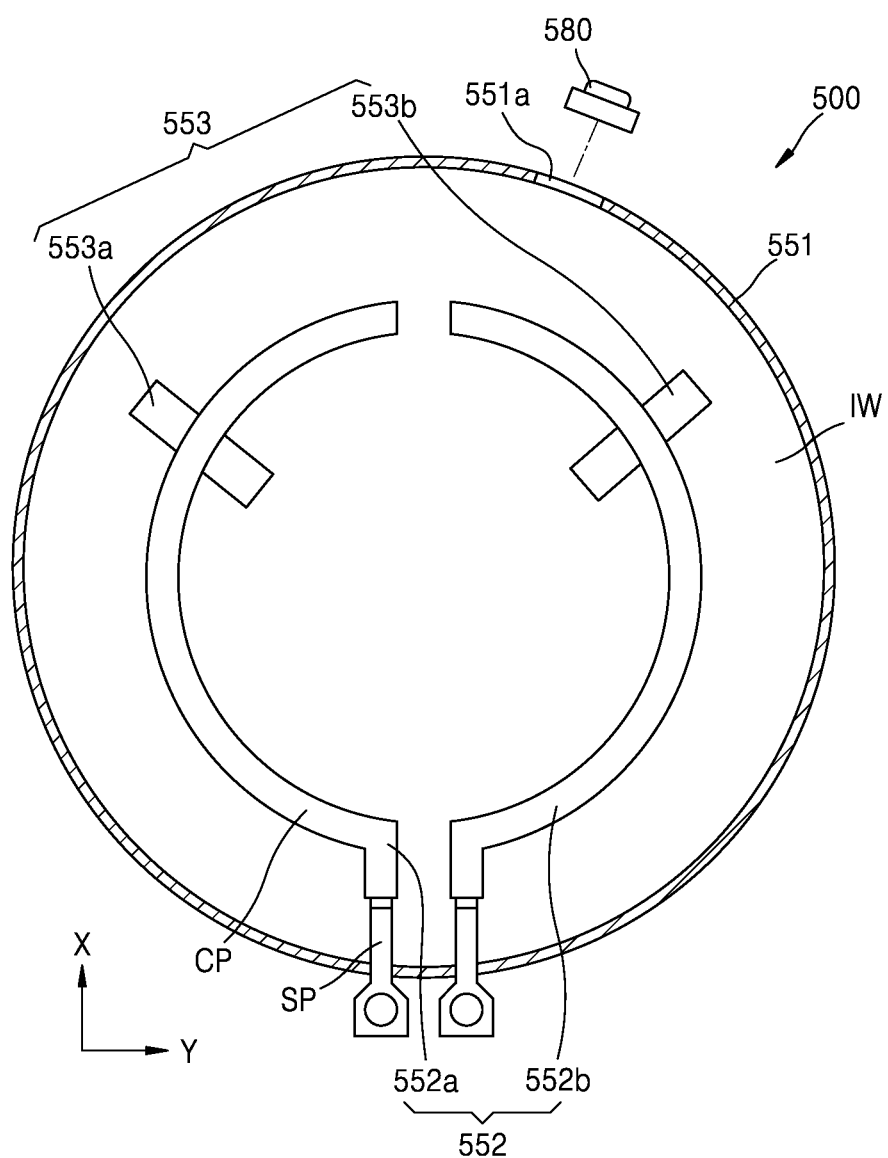
FIG. 17B is a view for describing an inlet portion of the electric heating pot of FIG. 15.

FIG. 15 is a schematic front view illustrating an electric heating pot according to another embodiment of the present disclosure, FIG. 16 is a cross-sectional view taken along line XVI-XVI of FIG. 15, and FIGS. 17A and 17B are views for describing an inlet portion of the electric heating pot of FIG. 15.

Referring to FIGS. 15 to 17B, an electric heating pot 500 of the present embodiment may include a body unit 510 and a heating unit 550.

The body unit 510 may be disposed to be adjacent to the heating unit 550 in one direction. For example, the body unit 510 may be disposed to be adjacent to the heating unit 550 in a length direction of the body unit 510.

In an embodiment, the body unit 510 and the heating unit 550 may be formed to be connected to each other. For example, the body unit 510 and the heating unit 550 may be integrally formed. In addition, the body unit 510 and the heating unit 550 may be in contact with each other or may be integrally formed with an intermediate member further disposed therebetween.

In an embodiment, the body unit 510 and the heating unit 550 may be formed to be separable from each other.

The body unit 510 may include an accommodation space configured to accommodate a liquid WT. The liquid WT may include various types of liquids, and may include various types of liquids that may be heated by the heating unit 550. For example, the liquid WT may include water, and in this case, the electric heating pot 500 may be used by a user to heat water.

In an embodiment, a discharge outlet 512, through which the liquid WT is discharged from the accommodation space of the body unit 510 by an operation such as pouring the liquid WT, may be formed to be connected to the accommodation space of the body unit 510.

In an embodiment, a handle 517 may be formed on one region of the body unit 510 so that the electric heating pot 500 may be easily handled. In addition, one or more button members BP may be formed on the handle 517 so that the user selectively controls the operation of the electric heating pot 500. The button member BP may be a button having a form physically separated from the handle 517. In an embodiment, the button member BP may include a button shape displayed on a display portion (not shown).

The heating unit 550 may be configured to provide heat to the body unit 510. For example, the heating unit 550 may be configured to heat the liquid WT accommodated in the accommodation space of the body unit 510.

The heating unit 550 may include a housing 551 and an electrode portion 552.

The housing 551 may be formed to accommodate an electrolyzed water IW. The electrolyzed water IW may include various types of electrolyzed water. For example, the electrolyzed water IW may include an electrolyte solution. In an embodiment, the electrolyzed water IW may include distilled water, filtered water, mineral water, tap water, and the like in which at least one of various types of electrolyte solutions is appropriately diluted.

As an electrolyte material included in the electrolyzed water IW, there are various types including rust inhibitors or the like that contain edible soda, chlorite, silicate, an inorganic material of polyphosphate, amines, oxyacids, or the like as main components.

The housing 151 of the above-described embodiment may be applied to the housing 551 in the same or similar manner, and in an embodiment, the structure described with reference to FIGS. 4A to 4C may be applied to the housing 551.

In an embodiment, an insulating layer (not shown) may be further formed between the housing 551 and the body unit 510. The contents thereof are the same as those described in the above-described embodiments, and thus, a detailed description thereof will be omitted.

Further, in an embodiment, a heat transfer portion (not shown) may be further formed between the housing 551 and the body unit 510 in the present embodiment. The contents of the heat transfer portion (not shown) are the same as those described in the above-described embodiments, and thus, a detailed description thereof will be omitted.

The electrode portion 552 may be disposed in the housing 551, may be formed such that at least one region thereof is in contact with the electrolyzed water IW in the housing, and may include a plurality of electrodes.

For example, the electrode portion 552 may include a first electrode 552a and a second electrode 552b.

Each of the first electrode 552a and the second electrode 552b may be formed to be in contact with the electrolyzed water IW in the housing 551. Although not shown in the drawings, current may be applied to the first electrode 552a and the second electrode 552b under the control of an electrode control portion (not shown), and the applied current may be controlled through the electrode control portion (not shown).

The electrolyzed water IW in the housing 551 may be heated due the current applied to the first electrode 552a and the second electrode 552b of the electrode portion 552. Heat of the electrolyzed water IW may be transferred to the body unit 510 to heat the liquid WT in the accommodation space.

The first electrode 552a and the second electrode 552b may be formed to be spaced apart from each other by a predetermined interval.

The first electrode 552a and the second electrode 552b may each include a curved region.

When the first electrode 552a is described as an example, the first electrode 552a may include a curved region CP. In an embodiment, the first electrode 552a may include a linear region SP that is connected to the curved region CP and includes a pull-out region.

In an embodiment, the curved region CP may include a curved region having a shape corresponding to an edge of the housing 551 and may have a semi-circular or arc shape.

The second electrode 552b may include a curved region. In an embodiment, second electrode 552b may have a shape symmetrical to that of the first electrode 552a.

Due to the shapes of the first electrode 552a and the second electrode 552b, a contact area between the electrode portion 552 and the electrolyzed water IW may be increased, and the performance of uniformly heating the electrolyzed water IW in the housing 551 may be improved.

An end portion of the curved region of each of the first electrode 552a and the second electrode 552b may be formed to be spaced apart from a region of the housing 551, for example, a side surface portion of the housing 551.

Further, in an embodiment, the first electrode 552a and the second electrode 552b may be formed to be spaced apart from a bottom portion and an upper surface portion of the housing 551.

Further, a conductive portion (not shown) connected to one region of each of the first electrode 552a and the second electrode 552b may be included so that current is applied to the first electrode 552a and the second electrode 552b therethrough. The conductive portion (not shown) may be a wire-shaped conductive line and may be connected to the electrode control portion (not shown). In an embodiment, the conductive portion (not shown) may be separately provided on an outside of the housing 551, and in another embodiment, may be integrally formed with one surface of the housing 551.

Although not shown in the drawings, in an embodiment, the electrode portion 552 may include three electrodes in the form of three phases.

In an embodiment, a support portion 553 may be configured to support the electrode portion 552.

For example, the support portion 553 may include a first support member 553a and a second support member 553b.

The first support member 553a may be configured to support the first electrode 552a, and the second support member 553b may be configured to support the second electrode 552b.

In an embodiment, the first electrode 552a may be fixed to the first support member 553a, and the second electrode 552b may be fixed to the second support member 553b. To this end, a separate fastening or bonding member may be used.

The support portion 553 may be disposed on one surface of the housing 551, and for example, may be connected to a bottom portion 551a of the housing 551. In an embodiment, the support portion 553 may be fixed to the bottom portion 551a.

The support portion 553 may include a highly durable material, and may include, for example, a resin-based material.

Further, in an embodiment, the support portion 553 may include a metal material.

An inlet portion 580 may be formed in one region of the housing 551 of the present embodiment. The inlet portion 580 may be a region used for replenishing the electrolyzed water IW in the housing 551. For example, as shown in FIG. 17A, the inlet portion 580 may be formed such that a supply line IL is connected thereto and separated therefrom, and may allow the electrolyzed water IW to be supplied into the housing 551 through the supply line IL.

Further, the inlet portion 580 may be formed such that the electrolyzed water IW in the housing 551 is discharge therethrough. For example, as shown in FIG. 17B, the inlet portion 580 may be entirely or partially detached from the housing 551 so that all or a portion of the electrolyzed water IW may be discharged from the housing 551.

An electric heating pot of the present embodiment may heat an electrolyzed water by controlling current applied to electrodes of an electrode portion of a heating unit. Heat of the electrolyzed water is transferred to a body unit to heat liquid in the body unit.

Accordingly, the liquid in the electric heating pot may be easily heated, thereby improving the convenience of a user. For example, hot water may be easily supplied to the user.

Further, selectively, the electrolyzed water may be stably heated by easily controlling the current applied to the electrodes of the electrode portion. Each of a first electrode and a second electrode of the electrode portion includes a curved region to increase a contact area with the electrolyzed water, so that a heating efficiency for the electrolyzed water may be improved. As a result, the liquid in the body unit may be easily heated, so that the efficiency of the electric heating pot may be improved and power consumption may be reduced.

Further, since the electrolyzed water may be supplied using an inlet portion when needed, the electrolyzed water in the housing is stably maintained, so that the heat supplied to the body unit through the heated electrolyzed water may be efficiently managed. Further, the electrolyzed water may be discharged from the body unit through the inlet portion, so that the electric heating pot may be easily stored and managed when an inside of the body unit is repaired or when the electric heating pot is not used.

Figure 18:
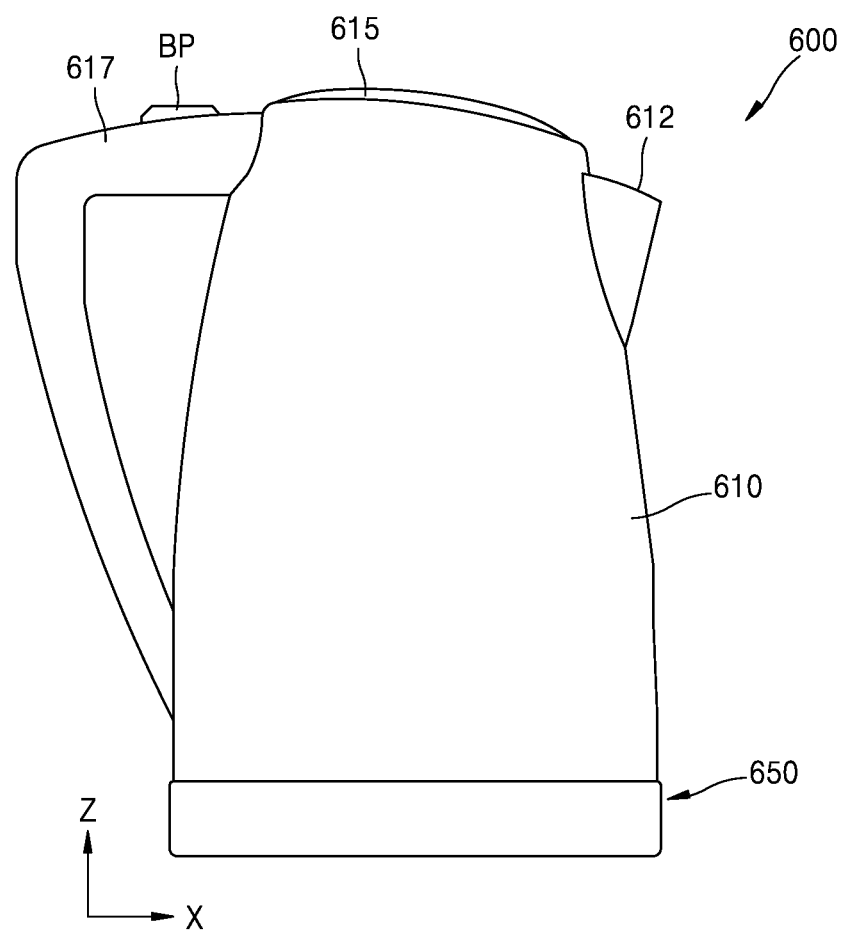
FIG. 18 is a schematic front view illustrating an electric heating pot according to another embodiment of the present disclosure.
Figure 19:
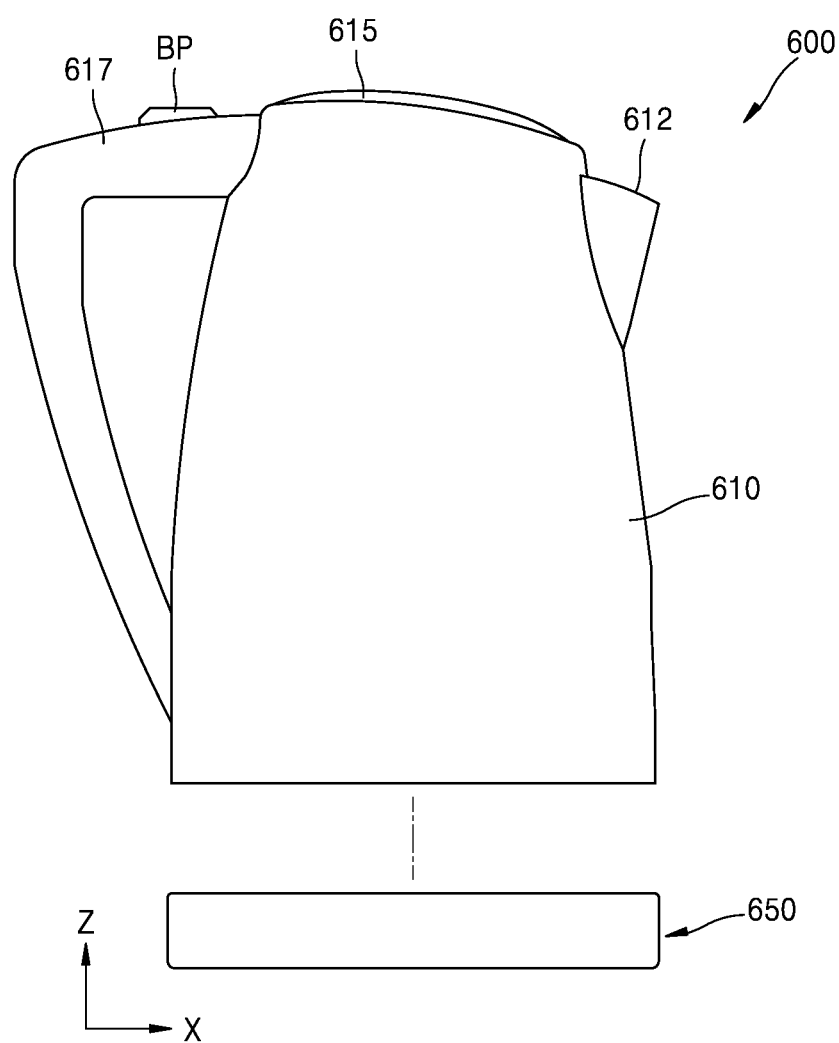
FIG. 19 is a view illustrating another state in the use of the electric heating pot of FIG. 18.

FIG. 18 is a schematic front view illustrating an electric heating pot according to another embodiment of the present disclosure, and FIG. 19 is a view illustrating another state in the use of the electric heating pot of FIG. 18.

An electric heating pot 600 may include a body unit 610 and a heating unit 650.

In an embodiment, the body unit 610 and the heating unit 650 may be formed to be connected to each other.

The body unit 610 may include an accommodation space configured to accommodate liquid.

In an embodiment, a discharge outlet 612, through which the liquid is discharged from the accommodation space of the body unit 610 by an operation such as pouring the liquid, may be formed to be connected to the accommodation space of the body unit 610.

In an embodiment, a handle 617 may be formed on one region of the body unit 610 so that the electric heating pot 600 may be easily handled. In addition, one or more button members BP may be formed on the handle 617 so that the user selectively controls the operation of the electric heating pot 600.

The body unit 610 and the heating unit 650 may be formed to be separable from each other. That is, the body unit 610 and the heating unit 650 may be formed such that, after the heating of the liquid in the body unit 610 through the heating unit 650 is completed, the body unit 610 is separated from the heating unit 650 so that a user may discharge the liquid at a desired point, for example, pour the liquid into a cup.

One of the embodiments described above may be selectively applied for the contents of the heating unit 650, and thus a detailed description thereof will be omitted.

In the electric heating pot according to the above-described embodiments, the body unit may be selectively separated from the heating unit according to user convenience as shown in FIGS. 18 and 19, so that the user convenience may be improved.

The present disclosure has been described with reference to the examples illustrated in the drawings, but these are only examples. It will be understood by those skilled in the art that various modifications and equivalent other examples may be made. Therefore, the scope of the present disclosure is defined by the appended claims.

The particular implementations shown and described herein are illustrative examples of the embodiments and are not intended to otherwise limit the scope of the embodiments in any way. In addition, no item or component is essential to the practice of the present disclosure unless the component is specifically described as "essential" or "critical."

The use of the terms "a" and "an" and "the" and similar referents in the context of describing the present disclosure (especially in the context of the following claims) are to be construed to cover both the singular and the plural. Further, recitation of ranges of values herein are merely intended to serve as a shorthand method of referring individually to each separate value falling within the range, unless otherwise indicated herein, and each separate value is incorporated into the specification as if it were individually recited herein. Finally, operations of all methods described herein can be performed in any suitable order unless otherwise indicated herein or otherwise clearly contradicted by context. The present disclosure is not limited to the described order of the operations. The use of any and all examples, or exemplary terms (e.g., "such as") provided herein, is intended merely to better illuminate the present disclosure and does not pose a limitation on the scope of the present disclosure unless otherwise claimed. Also, numerous modifications and adaptations will be readily apparent to one of ordinary skill in the art without departing from the spirit and scope of the present disclosure.

In the electric heating pot according to the above-described embodiments, a body unit may be separated from a heating unit according to user convenience, so that the user convenience may be improved.

The invention claimed is:

1. An electric heating pot comprising a body unit and a heating unit configured to provide heat to the body unit, wherein
    the body unit comprises an accommodation space configured to accommodate liquid,
    the heating unit comprises a housing formed such that electrolyzed water is disposed therein, and an electrode portion that is disposed in the housing, formed such that at least one region thereof is in contact with the electrolyzed water in the housing, and includes a plurality of electrodes, and
    the housing further comprises an outer layer and an inner layer, the inner layer being formed from an electrical insulating material and having an inner surface in contact with the electrolyzed water.

2. The electric heating pot of claim 1, wherein the body unit and the heating unit are formed to be separable from each other.

3. The electric heating pot of claim 1, wherein an extending end portion of each of the plurality of electrodes is spaced apart from the inner surface of the housing.

4. The electric heating pot of claim 1, wherein
    the housing comprises an upper surface portion facing the body unit and a bottom portion facing a side opposite to the body unit, and
    the plurality of electrodes of the electrode portion are formed to be spaced apart from the upper surface portion and the bottom portion.

5. The electric heating pot of claim 1, wherein the electrode portion comprises a curved region.

6. The electric heating pot of claim 1, further comprising an insulating layer disposed between the heating unit and the body unit.

7. The electric heating pot of claim 1, further comprising a heat transfer portion disposed between the heating unit and the body unit.

* * * * *